(12) United States Patent
Takamatsu

(10) Patent No.: US 8,468,105 B2
(45) Date of Patent: Jun. 18, 2013

(54) LEARNING APPARATUS, LEARNING METHOD, INFORMATION PROCESSING APPARATUS, DATA SELECTION METHOD, DATA ACCUMULATION METHOD, DATA CONVERSION METHOD AND PROGRAM

(75) Inventor: Shingo Takamatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 826 days.

(21) Appl. No.: 12/688,647

(22) Filed: Jan. 15, 2010

(65) Prior Publication Data

US 2010/0191682 A1    Jul. 29, 2010

(30) Foreign Application Priority Data

Jan. 28, 2009 (JP) ................. P2009-017190

(51) Int. Cl.
*G06F 15/18* (2006.01)
*G06F 17/20* (2006.01)

(52) U.S. Cl.
USPC .............................. 706/12; 715/744; 382/159

(58) Field of Classification Search
USPC ........................................................ 706/12
See application file for complete search history.

(56) References Cited

U.S. PATENT DOCUMENTS

2003/0229537 A1* 12/2003 Dunning et al. ................ 705/10
2010/0245361 A1*  9/2010 Ofek et al. .................... 345/441

FOREIGN PATENT DOCUMENTS

JP    2006-215867    8/2006
JP    2008-77386     4/2008

OTHER PUBLICATIONS

D. M. Blei et al., "Modeling Annotated Data", Journal of Machine Learning Research 3, 8 pages (2003).
T. Hofmann, "Unsupervised Learning by Probabilistic Latent Semantic Analysis", Machine Learning, vol. 42, pp. 177-196 (2001).

* cited by examiner

*Primary Examiner* — Kakali Chaki
*Assistant Examiner* — Kalpana Bharadwaj
(74) *Attorney, Agent, or Firm* — Finnegan, Henderson, Farabow, Garrett & Dunner, LLP

(57) ABSTRACT

There is provided a learning apparatus including: a first data acquisition unit which acquires first user preference data belonging to a first data space; a second data acquisition unit which acquires second user preference data of a user in common with the first user preference data, the second user preference data belonging to a second data space which is different from the first data space; a compression unit which generates first compressed user preference data having less data item number from the first user preference data by utilizing a first set of parameters; and a learning unit which learns a second set of parameters utilized for generating second compressed user preference data having the same data item number as that of the first compressed user preference data from the second user preference data so that difference between the first compressed user preference data and the second compressed user preference data is to be small across a plurality of users.

19 Claims, 20 Drawing Sheets

LEARNING APPARATUS, LEARNING METHOD, INFORMATION PROCESSING APPARATUS, DATA SELECTION METHOD, DATA ACCUMULATION METHOD, DATA CONVERSION METHOD AND PROGRAM

BACKGROUND OF THE INVENTION

1. Field of the Invention

The present invention relates to a learning apparatus, a learning method, an information processing apparatus, a data selection method, a data accumulation method, a data conversion method and a program.

2. Description of the Related Art

Recently, a variety of contents such as music, video, books and news articles have been provided to users via a network such as the internet with progress of information technology. Since enormous amounts of contents are managed in such content providing services, users have difficulties in finding by oneself an appropriate content which suits each user. Accordingly, a technology called recommendation has been utilized to acquire user's preference based on a user's action history such as purchasing or viewing, for example, and to select and propose contents suitable for individual users.

Utilizing user preference data (UP) which indicates user's preference by numerals or the like according to the user's action history in order to perform recommendation is one of the common points in many of the existing recommendation technologies. For example, in recommendation algorithm called collaborative filtering, the user preference data are compared among different users so as to specify a user having similar preference, and then, a content used by the user in the past is to be the subject for recommendation. Examples of this recommendation algorithm are disclosed in Japanese Patent Application Laid-Open Nos. 2006-215867 and 2008-077386. Meanwhile, for example, in the recommendation algorithm called content-based filtering, user preference data and content property data indicating content properties in a common data space are compared, and then, contents which are determined to be suitable for the user's preference may become the subject for recommendation.

SUMMARY OF THE INVENTION

However, there is a case where the data spaces of the user preference data or the content property data are different from one another due to differences in, for example, content areas to be the subject for recommendation, device types to generate user preference data, vendors of supplying devices or the like. When the data spaces are different, the range of contents capable of being recommended based on the user preference data or the content property data will be restricted. In addition, there is a case where appropriate contents are difficult to be recommended because of insufficient accumulation of the action history, for example.

In light of the foregoing, it is desirable to provide a novel and improved learning apparatus, a learning method, an information processing apparatus, a data selection method, a data accumulation method, a data conversion method and a program which are capable of commonly managing user preferences or content properties among domains of different data spaces.

According to an embodiment of the present invention, there is provided a learning apparatus including: a first data acquisition unit which acquires first user preference data belonging to a first data space; a second data acquisition unit which acquires second user preference data of a user in common with the first user preference data, the second user preference data belonging to a second data space which is different from the first data space; a compression unit which generates first compressed user preference data having less data item number from the first user preference data by utilizing a first set of parameters; and a learning unit which learns a second set of parameters utilized for generating second compressed user preference data having the same data item number as that of the first compressed user preference data from the second user preference data so that difference between the first compressed user preference data and the second compressed user preference data is to be small across a plurality of users.

The learning unit may learn the second set of parameters with the first compressed user preference data generated by the compression unit as training data for the second compressed user preference data.

The compression unit may generate the first compressed user preference data in accordance with a multi-topic model.

The first set of parameters and the second set of parameters may be sets of parameters corresponding to intrinsic distribution of a topic of the multi-topic model.

The first data space and the second data space may be data spaces corresponding to content domains which are different from each other.

The first data space and the second data space may be data spaces of user preference data generated by devices which are different from each other.

According to another embodiment of the present invention, there is provided a learning method, including the steps of: acquiring first user preference data belonging to a first data space; acquiring second user preference data of a user in common with the first user preference data, the second user preference data belonging to a second data space which is different from the first data space; generating first compressed user preference data having less data item number from the first user preference data by utilizing a first set of parameters; and learning a second set of parameters utilized for generating second compressed user preference data having the same data item number as that of the first compressed user preference data from the second user preference data so that difference between the first compressed user preference data and the second compressed user preference data is to be small across a plurality of users.

According to another embodiment of the present invention, there is provided a program for causing a computer which controls an information processing apparatus to perform functions including: a first data acquisition unit which acquires first user preference data belonging to a first data space; a second data acquisition unit which acquires second user preference data of a user in common with the first user preference data, the second user preference data belonging to a second data space which is different from the first data space; a compression unit which generates first compressed user preference data having less data item number from the first user preference data by utilizing a first set of parameters; and a learning unit which learns a second set of parameters utilized for generating second compressed user preference data having the same data item number as that of the first compressed user preference data from the second user preference data so that difference between the first compressed user preference data and the second compressed user preference data is to be small across a plurality of users.

According to another embodiment of the present invention, there is provided an information processing apparatus, including: a data acquisition unit which acquires first user preference data belonging to a first data space; a compression unit which generates first compressed user preference data having less data item number from the first user preference data by utilizing a first set of parameters; a storage unit which stores a plurality of data having the same data item number as that of the first compressed user preference data, the plurality of data being generated from second user preference data or content property data belonging to a second data space which is different from the first data space by utilizing a second set of parameters; and a selection unit which selects at least single data from the plurality of data stored at the storage unit according to similarity degree to the first compressed user preference data generated by the compression unit, wherein the plurality of data stored at the storage unit are respective data previously generated by utilizing the second set of parameters which is learned so that difference between the first compressed user preference data and second compressed user preference data generated from the second user preference data of a common user is to be small across a plurality of users.

According to another embodiment of the present invention, there is provided a data selection method, including the steps of: acquiring first user preference data belonging to a first data space; generating first compressed user preference data having less data item number from the first user preference data by utilizing a first set of parameters; and selecting at least single data from a plurality of data having the same data item number as that of the first compressed user preference data according to similarity degree to the first compressed user preference data, the plurality of data being generated from second user preference data or content property data belonging to a second data space which is different from the first data space by utilizing a second set of parameters, wherein the plurality of data are respective data previously generated by utilizing the second set of parameters which is learned so that difference between the first compressed user preference data and second compressed user preference data generated from the second user preference data of a common user is to be small across a plurality of users.

According to another embodiment of the present invention, there is provided a program for causing a computer which controls an information processing apparatus to perform functions including: a data acquisition unit which acquires first user preference data belonging to a first data space; a compression unit which generates first compressed user preference data having less data item number from the first user preference data by utilizing a first set of parameters; a storage unit which stores a plurality of data having the same data item number as that of the first compressed user preference data, the plurality of data being generated from second user preference data or content property data belonging to a second data space which is different from the first data space by utilizing a second set of parameters; and a selection unit which selects at least single data from the plurality of data stored at the storage unit according to similarity degree to the first compressed user preference data generated by the compression unit, wherein the plurality of data stored at the storage unit are respective data previously generated by utilizing the second set of parameters which is learned so that difference between the first compressed user preference data and second compressed user preference data generated from the second user preference data of a common user is to be small across a plurality of users.

According to another embodiment of the present invention, there is provided an information processing apparatus, including: a first data acquisition unit which acquires first user preference data belonging to a first data space; a second data acquisition unit which acquires second user preference data belonging to a second data space which is different from the first data space; a first compression unit which generates first compressed user preference data having less data item number from the first user preference data by utilizing a first set of parameters and stores the first compressed user preference data at a recording medium; and a second compression unit which generates second compressed user preference data having the same data item number as that of the first compressed user preference data from the second user preference data by utilizing a second set of parameters and stores the second compressed user preference data at a recording medium, wherein the first set of parameters or the second set of parameters is a set of parameters which is learned so that difference between the first compressed user preference data and the second compressed user preference data of a common user is to be small across a plurality of users.

According to another embodiment of the present invention, there is provided a data accumulation method, including the steps of: acquiring first user preference data belonging to a first data space; acquiring second user preference data belonging to a second data space which is different from the first data space; generating first compressed user preference data having less data item number from the first user preference data by utilizing a first set of parameters and storing the first compressed user preference data at a recording medium; and generating second compressed user preference data having the same data item number as that of the first compressed user preference data from the second user preference data by utilizing a second set of parameters and storing the second compressed user preference data at a recording medium, wherein the first set of parameters or the second set of parameters is a set of parameters which is learned so that difference between the first compressed user preference data and the second compressed user preference data of a common user is to be small across a plurality of users.

According to another embodiment of the present invention, there is provided a program for causing a computer which controls an information processing apparatus to perform functions including: a first data acquisition unit which acquires first user preference data belonging to a first data space; a second data acquisition unit which acquires second user preference data belonging to a second data space which is different from the first data space; a first compression unit which generates first compressed user preference data having less data item number from the first user preference data by utilizing a first set of parameters and stores the first compressed user preference data at a recording medium; and a second compression unit which generates second compressed user preference data having the same data item number as that of the first compressed user preference data from the second user preference data by utilizing a second set of parameters and stores the second compressed user preference data at a recording medium, wherein the first set of parameters or the second set of parameters is a set of parameters which is learned so that difference between the first compressed user preference data and the second compressed user preference data of a common user is to be small across a plurality of users.

According to another embodiment of the present invention, there is provided an information processing apparatus, including: a storage unit which stores a first set of parameters to generate first compressed user preference data having less data item number from first user preference data belonging to a first data space and a second set of parameters to generate second compressed user preference data having the same data item number as that of the first compressed user preference data from second user preference data belonging to a second data space which is different from the first data space; and a conversion unit which converts the first user preference data into the second user preference data based on the first set of parameters and the second set of parameters which are stored at the storage unit, wherein the first set of parameters or the second set of parameters is a set of parameters which is learned so that difference between the first compressed user preference data and the second compressed user preference data of a common user is to be small across a plurality of users.

The conversion unit may convert the first user preference data into the second user preference data in accordance with correspondence between data items of the first user preference data and data items of the second user preference data, the correspondence being determined according to similarity degree of parameter values of each data item between the first set of parameters and the second set of parameters.

The information processing apparatus may further include: a compression unit which generates the first compressed user preference data from the first user preference data by utilizing the first set of parameters, and the conversion unit may determine likely second user preference data capable of generating the first compressed user preference data generated by the compression unit by utilizing the second set of parameters as the second user preference data converted from the first user preference data.

According to another embodiment of the present invention, there is provided a data conversion method, including: a step of converting first user preference data into second user preference data based on a first set of parameters to generate first compressed user preference data having less data item number from the first user preference data belonging to a first data space and a second set of parameters to generate second compressed user preference data having the same data item number as that of the first compressed user preference data from the second user preference data belonging to a second data space which is different from the first data space, wherein the first set of parameters or the second set of parameters is a set of parameters which is learned so that difference between the first compressed user preference data and the second compressed user preference data of a common user is to be small across a plurality of users.

According to another embodiment of the present invention, there is provided a program for causing a computer which controls an information processing apparatus to perform functions including: a storage unit which stores a first set of parameters to generate first compressed user preference data having less data item number from first user preference data belonging to a first data space and a second set of parameters to generate second compressed user preference data having the same data item number as that of the first compressed user preference data from second user preference data belonging to a second data space which is different from the first data space; and a conversion unit which converts the first user preference data into the second user preference data based on the first set of parameters and the second set of parameters which are stored at the storage unit, wherein the first set of parameters or the second set of parameters is a set of parameters which is learned so that difference between the first compressed user preference data and the second compressed user preference data of a common user is to be small across a plurality of users.

As described above, according to the present invention, there can be provided a learning apparatus, a learning method, an information processing apparatus, a data selection method, a data accumulation method, a data conversion method and a program capable of commonly managing user preferences or content properties among domains of different data spaces.

DETAILED DESCRIPTION OF EMBODIMENT(S)

Figure 1:
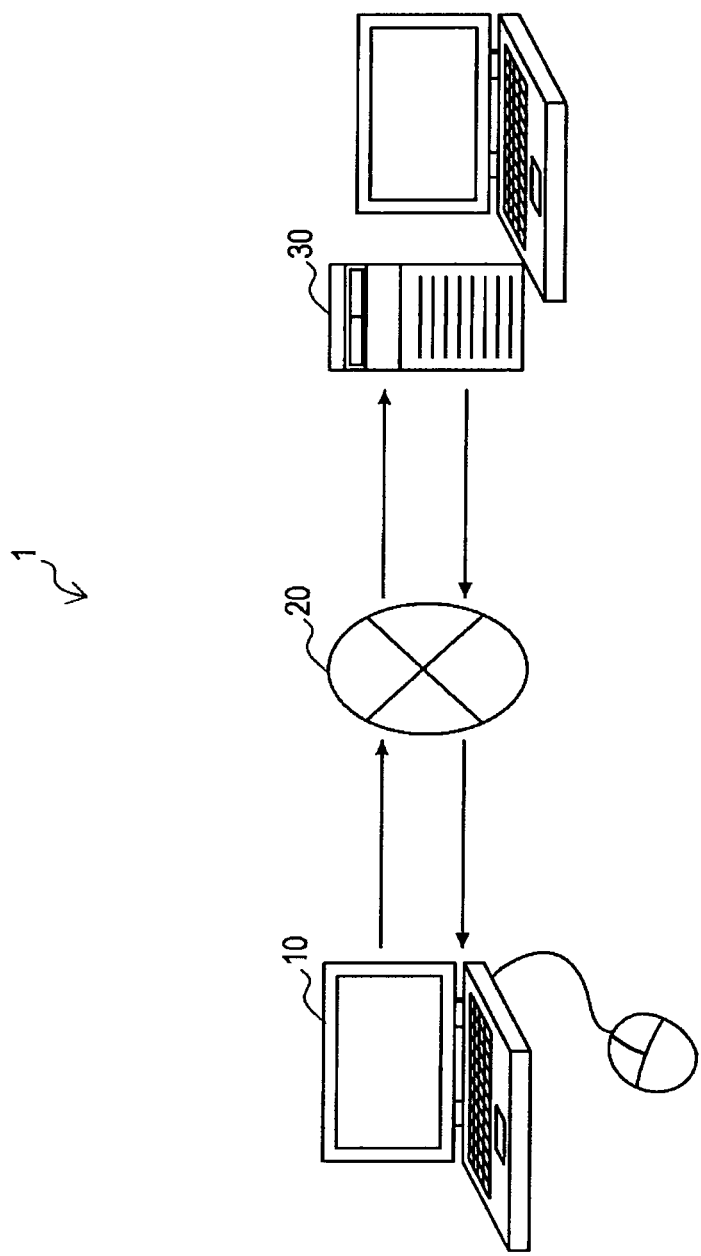
FIG. 1 is a schematic view which illustrates an outline of a system to which a recommendation technology associated with an embodiment is applied.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Hereinafter, preferred embodiments of the present invention will be described in the following order.

1. Description of Related Art
2. Description of a Learning Apparatus According to an Embodiment
3. Description of a Recommendation Apparatus According to an Embodiment
4. Description of a Data Accumulation Apparatus According to an Embodiment
5. Description of a Data Conversion Apparatus According to an Embodiment
6. Summary 1. Description of Related Art First, a recommendation technology associated with a later-mentioned embodiment of the present invention will be described with reference to FIGS. 1 to 7.

FIG. 1 is a schematic view which illustrates an outline of an information processing system 1 to which a recommendation technology associated with an embodiment of the present invention is applied. As illustrated in FIG. 1, the information processing system 1 includes a terminal device 10, a network 20 and an information processing apparatus 30.

The terminal device 10 is used by a user to receive offering of a recommendation service from the information processing apparatus 30. For example, the terminal device 10 may be an information processing terminal such as a personal computer (PC) and a personal digital assistant (PDA), a cellular phone terminal, a game terminal, a digital home appliance such as a music player and a television set, and the like.

Figure 2:
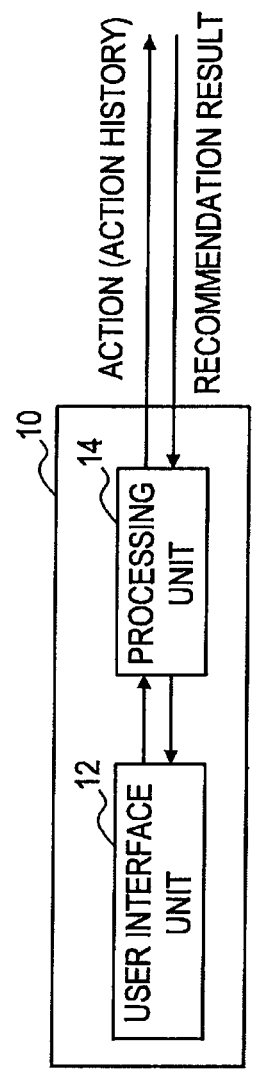
FIG. 2 is a block diagram which illustrates an example of a specific configuration of the terminal device of FIG. 1.

FIG. 2 is a block diagram which illustrates an example of a further specific configuration of the terminal device 10. As illustrated in FIG. 2, the terminal device 10 includes a user interface unit 12 and a processing unit 14.

For example, the user interface unit 12 provides display means to display information for a user by the terminal device 10 and input means to input information to the terminal device 10 by the user. For example, the display means corresponds to a display device such as CRT, PDP, LCD and OLED. Further, for example, the input means corresponds to a mouse, a keyboard, a touch panel, a button, a switch or the like.

For example, the processing unit 14 may be a browser which acquires a webpage on the internet and provides the webpage to a user for reading. In that case, a request of the user for the user's action such as purchasing or viewing/listening of a content on the internet is transmitted from the processing unit 14 to the information processing apparatus 30. Further, the processing unit 14 may be an application which replays or executes the content at the terminal device 10. In that case, the information regarding the action of replaying or executing of the content by the user is transmitted from the processing unit 14 to the information processing apparatus 30. Here, the processing unit 14 may temporally store a history of the user's individual actions inside the terminal device 10 and transmit the accumulated action histories to the information processing apparatus 30 at predetermined timing.

Referring again to FIG. 1, description of the information processing system 1 will be continued.

The network 20 connects the terminal device 10 and the information processing apparatus 30. The network 20 may be an arbitrary network such as the internet, a wired or wireless local area network (LAN), a wide area network (WAN), a lease line and a virtual private network.

The information processing apparatus 30 provides a recommendation service to the user of the terminal device 10. For example, the information processing apparatus 30 is configured as a computer accessible to a storage device which stores content property data and user preference data. For example, the information processing apparatus 30 may be a server device which provides the recommendation service. Further, the information processing apparatus 30 may be a PC, a workstation, the abovementioned digital appliance or the like.

Figure 3:
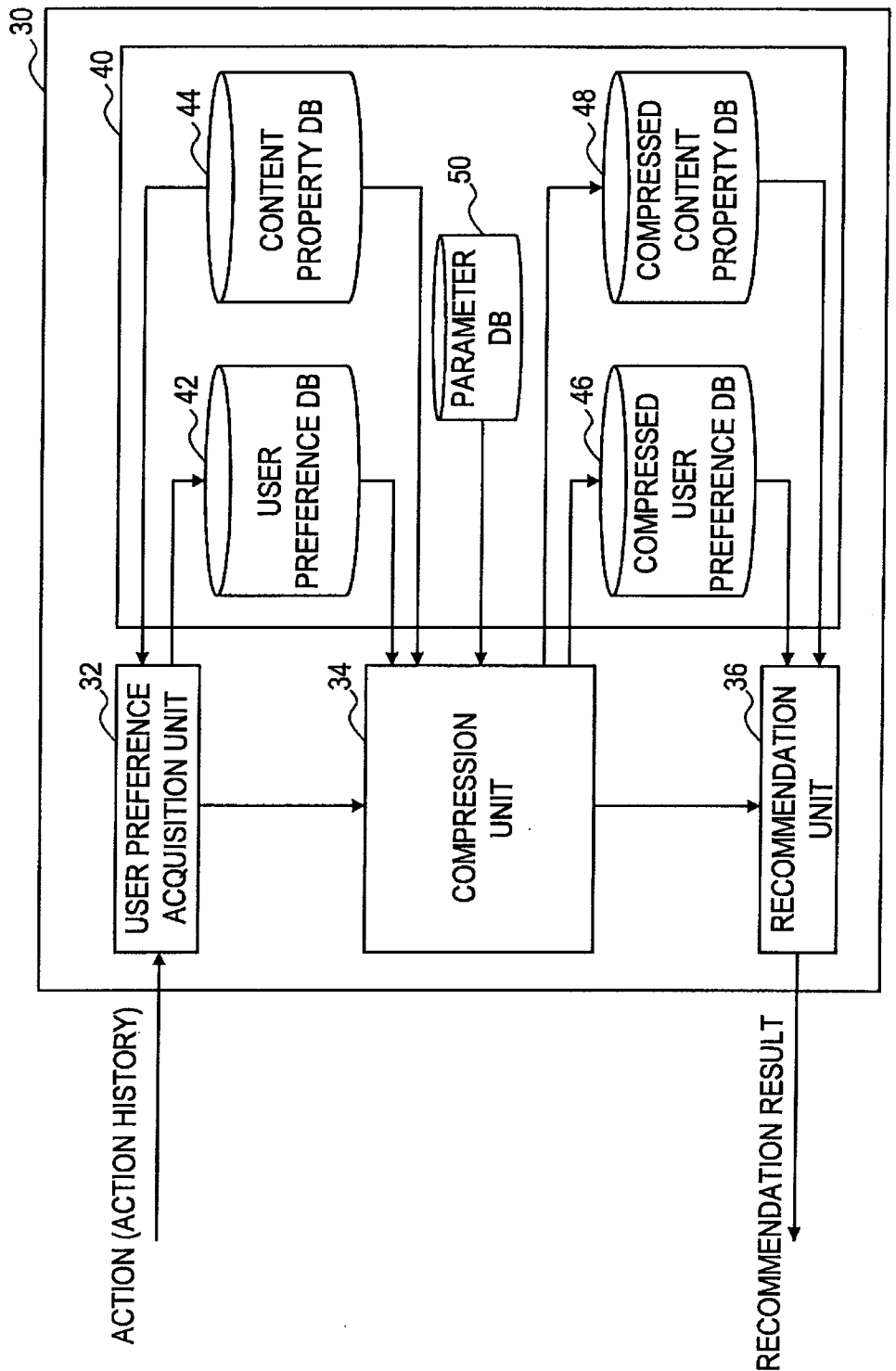
FIG. 3 is a block diagram which illustrates an example of a specific configuration of the information processing apparatus of FIG. 1.

FIG. 3 is a block diagram which illustrates an example of a further specific configuration of the information processing apparatus 30. As illustrated in FIG. 3, the information processing apparatus 30 includes a user preference acquisition unit 32, a compression unit 34, a recommendation unit 36 and a storage unit 40. Further, the storage unit 40 includes a user preference database (DB) 42, a content property DB 44, a compressed user preference DB 46, a compressed content property DB 48 and a parameter DB 50.

The user preference acquisition unit 32 acquires user preference data indicating preference of a user, for example, in accordance with an action or an action history which is transmitted from the terminal device 10. For example, the user preference data to be applied to content-based filtering may be expressed by the linear sum of the content property data in a data space corresponding to a content domain of the contents which were the subjects of the user's actions.

Figure 4:
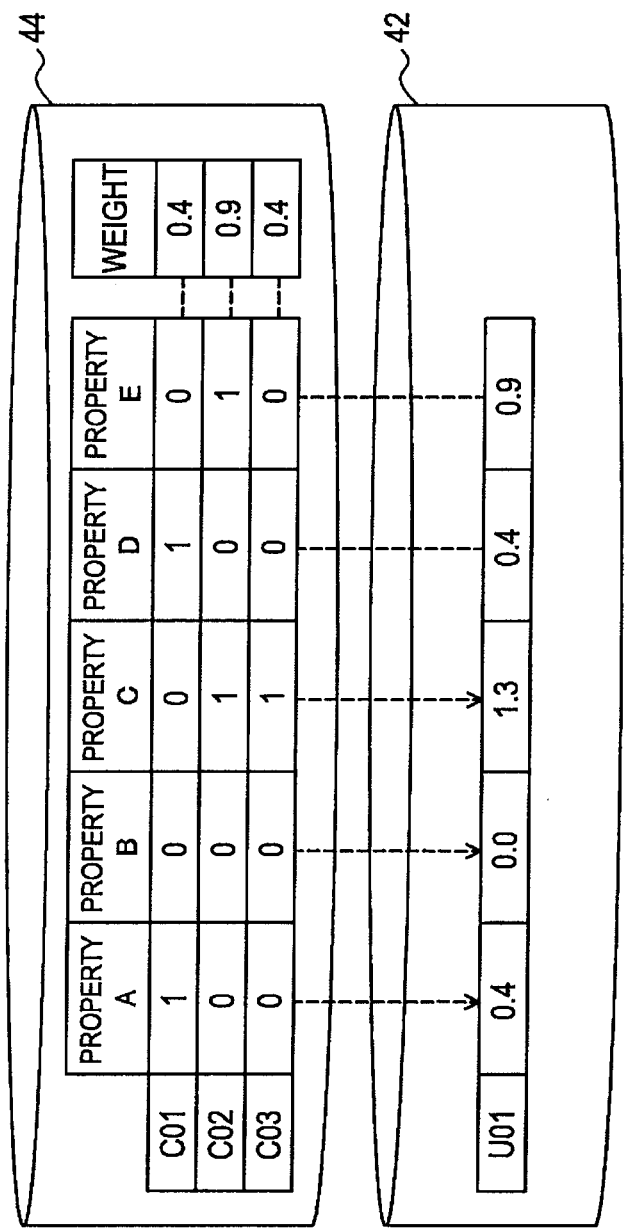
FIG. 4 is an explanatory view which illustrates a calculating process to calculate user preference data from content property data.

FIG. 4 is an explanatory view which illustrates an example of a calculation process to calculate the user preference data from the content property data stored at the content property DB 44 of the storage unit 40.

In the example of FIG. 4, the content property DB 44 includes three pieces of the content property data indicated as identifiers of C01, C02 and C03. Each content property data has five data items of properties A to E. Namely, the data space of the content property data in this case is a vector space having five dimensions corresponding to properties A to E. In this vector space, the content property data of the content C01 is expressed as a vector of (1, 0, 0, 1, 0), for example. Then, the content property data of the contents C02, C03 are respectively expressed as vectors of (0, 0, 1, 0, 1) and (0, 0, 1, 0, 0). Further, in FIG. 4, a weight used for calculating the user preference data is respectively defined for the content property data.

In the example of FIG. 4, the data space of the user preference data has five data items of properties A to E as well. The value of each of the five data items is calculated, for example, as the weighted linear sum of the content property data stored at the content property DB 44 of the content which is the subject of the user's action. For example, assuming that a user identified with an identifier U01 has used the contents C01, C02 and C03. In this case, the user preference data of the user U01 have following values. The value of property A is to be 0.4 (=1×0.4+0×0.9+0×0.4). The value of property B is to be 0.0 (=0×0.4+0×0.9+0×0.4). The value of property C is to be 1.3 (=0×0.4+1×0.9+1×0.4). The value of property D is to be 0.4 (=1×0.4+0×0.9+0×0.4). Then, the value of property E is to be 0.9 (=0×0.4+1×0.9+0×0.4). Accordingly, the user preference data of the user U01 is expressed as (0.4, 0.0, 1.3, 0.4, 0.9) in the vector space having properties A to E as the elements thereof. The user preference acquisition unit 32 calculates such user preference data and stores at the user preference DB 42.

In the example of the above description, the user preference data is calculated as the weighted linear sum of the content property data. However, weighting may not be necessarily performed for calculating the linear sum. Further, the user preference data may be calculated by a method other than the linear sum in the data space being common to the content property data.

Here, only the five data items of properties A to E are described in the example of FIG. 4. However, in general, the data space of practical content property data (and the user preference data) has higher dimensions. For example, the content property data is given in advance by analyzing text of content description which explains the content with a method of term frequency (TF)/inverse document frequency (IDF) and the like or by analyzing audio and/or video of the content data itself. Such content property data is apt to be a sparse vector having values of zero or empty at many data items in a high-dimensional vector space. This is disadvantageous for the recommendation algorithm such as the content-based filtering in view of process cost, accuracy of recommendation result and the like. Accordingly, the content property data or the user preference data is compressed to a lower-dimensional data by the compression unit 34 of FIG. 3.

In FIG. 3, the compression unit 34 generates the compressed user preference data having less number of data items from the user preference data by utilizing a set of parameters which is stored at the parameter DB 50. Further, the compression unit 34 can generate the compressed content property data having less number of data items from the content property data by utilizing a set of parameters which is stored at the parameter DB 50 as well.

The compression of the user preference data by the compression unit 34 may be performed in accordance with the concept of a multi-topic model, for example. The multi-topic model is a probabilistic model which utilizes probability distributions in a data-intrinsic topic space and probability distributions which are respectively allocated for topics in a metadata space. Specifically, a plurality of variations of the probability models have been proposed in Thomas Hofmann, 'Probabilistic Potential Semantic Indexing', Proceedings of the twenty-second Annual International SIGIR Conference on Research and Development in Information Retrieval, 1999, David M. Blei, Andrew Y. Ng, Michael I. Jordan, 'Potential Dirichlet Allocation', Journal of Machine Learning Research 3, 2003, and the like. Following are main portions thereof to be associated with the present invention.

First, in the multi-topic model, a plurality of topics is defined as actual values of potential discrete probability variables which may not be directly observed. A probability distribution of a metadata space is allocated to each topic. The probability distribution of the metadata space allocated to each topic is called the topic intrinsic distribution.

By applying the concept of the multi-topic model to the recommendation system, the topic intrinsic distribution is estimated in advance by statistical learning with a group of the content property data and/or the user preference data as learning data. Then, each content property data or each user preference data has intrinsic probability distribution which is called the topic distribution in the topic space as being the potential variable space. For example, the probability distribution in the metadata space of each content property data or each user preference data is acquired by averaging the topic intrinsic distribution by utilizing the topic distribution. Herein, the metadata space may be the vector space having properties A to E shown in FIG. 4 as the elements thereof and the like.

In general, the dimension of the parameters of the topic distribution is low. Further, since the topic distribution is determined for each content property data or for each user preference data, the parameters of the topic distribution generated from the content property data or the user preference data can be regarded as the data compressed in dimension of each data. Therefore, in this specification, the parameters of the topic distribution corresponding to the content property data is called the compressed content property data, and the parameters of the topic distribution corresponding to the user preference data is called the compressed user preference data.

Such compressed content property data or compressed user preference data are capable of being calculated once topic intrinsic distributions are determined. That is, the content property data or the user preference data which is the high-dimensional sparse vector can be compressed to be low dimensional in accordance with the multi-topic model.

The compression unit 34 of FIG. 3 can generate the compressed user preference data as the topic distribution corresponding to the user preference data by utilizing the parameters of the topic intrinsic distribution which is previously determined by learning in accordance with the concept of the multi-topic model, for example. In this case, the parameters of the topic intrinsic distribution are previously stored at the parameter DB 50 of FIG. 3. Hereinafter, in this specification, the parameters of the topic intrinsic distribution used for the compression of the user preference data or the content property data are called the model parameters. Note that, not limited to the parameters of the topic intrinsic distribution of the multi-topic model, the parameters used for the compression may be other arbitrary parameters.

Figure 5:
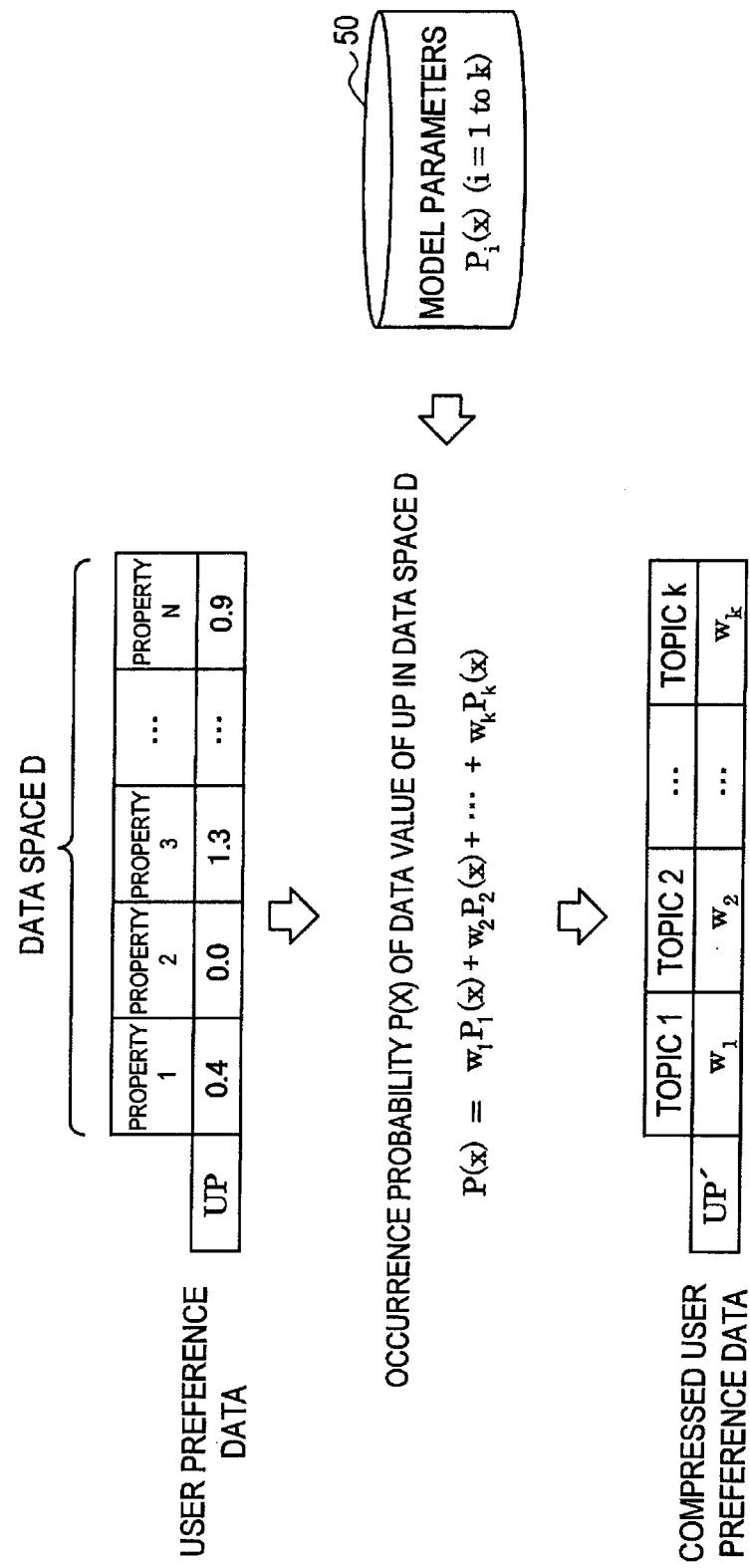
FIG. 5 is an explanatory view which illustrates a process to compress data in accordance with a multi-topic model.

FIG. 5 is an explanatory view which further illustrates a process to generate the compressed user preference data having less number of the data items from the user preference data in accordance with the concept of the multi-topic model.

As illustrated in FIG. 5, first, the user preference data UP is provided in the data space D as the vector space with N pieces of elements of properties 1 to N. Further, k pieces of the model parameters $P_i(x)$ (i=1–k) which are previously determined in the data space D by learning is provided as well. The model parameters $P_i(x)$ (i=1–k) correspond to the probability distribution respectively corresponding to k pieces of topics in the data space D, namely, correspond to the topic intrinsic distribution. As described above, in general, k is smaller than N. Here, when the occurrence probability of a predetermined data value of the user preference data UP in the data space D is to be P(x), P(x) is expressed by the following equation by utilizing k pieces of the model parameters $P_i(x)$ (i=1–k).

[Math 1]

$$P(x)=w_1P_1(x)+w_2P_2(x)+\ldots+w_kP_k(x) \quad (1)$$

Herein, the parameters of the topic distribution corresponding to the user preference data UP are expressed by $w_i$ (i=1–k). Namely, each $w_i$ corresponds to a topic mixing ratio. By utilizing the topic mixing ratios $w_i$ (i=1–k), the compressed user preference data UP' is calculated as the vector with the elements of the topic mixing ratios $(w_1, w_2, \ldots, w_k)$. Note that such data compression can be similarly performed on the content property data instead of the user preference data.

Referring to FIG. 3 once more, the description of the configuration of the information processing apparatus 30 will be continued.

The recommendation unit 36 of the information processing apparatus 30 specifies the content suitable for the user by utilizing the compressed user preference data and the compressed content property data of which dimensions are compressed (i.e., of which data item number is reduced) by the compression unit 34 as described above, and then, transmits to the terminal device 10 as the recommendation result.

Figure 6:
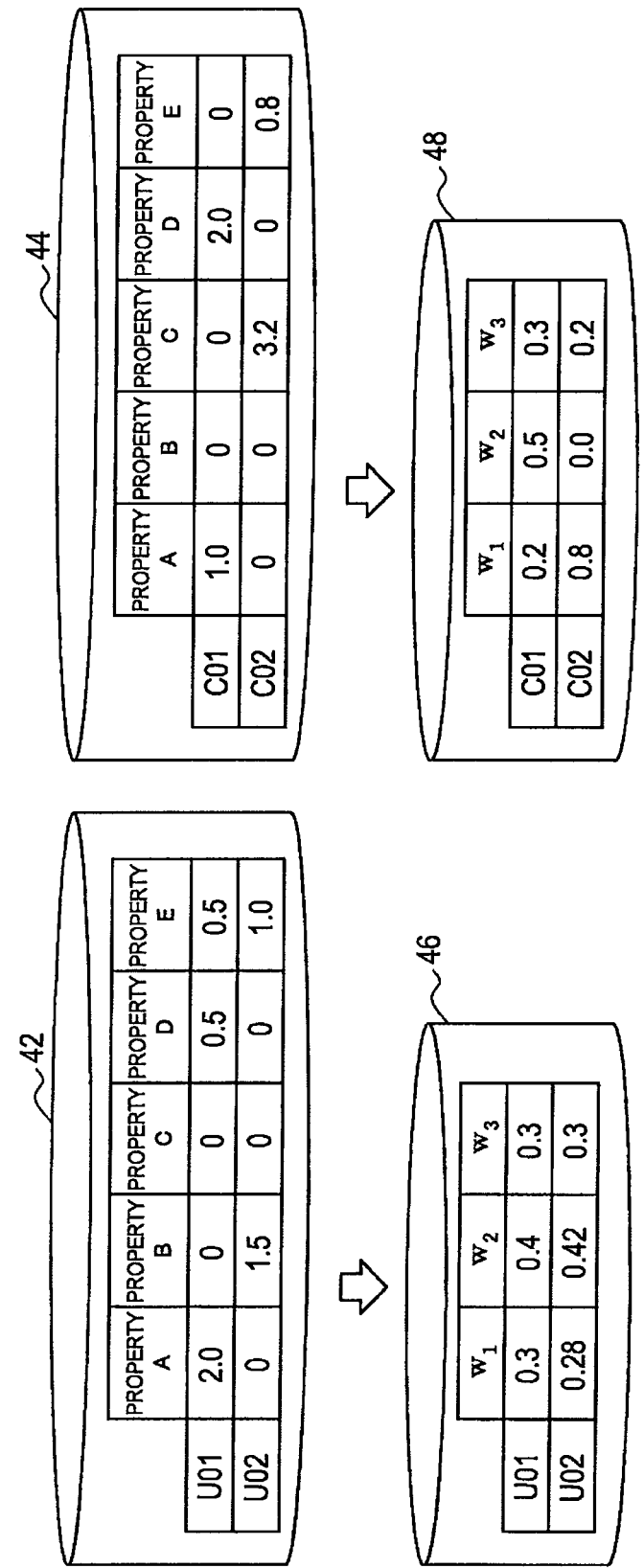
FIG. 6 is an explanatory view which illustrates an example of compressed user preference data and compressed content property data.

FIG. 6 is an explanatory view which illustrates a data example of the compressed user preference data and the compressed content property data.

As illustrated in FIG. 6, the user preference DB 42 includes two pieces of user preference data for the users U01, U02 in the data space of five dimensions of properties A to E. Meanwhile, the compressed user preference DB 46 includes two pieces of compressed user preference data which are respectively compressed into three dimensions. By compressing the user preference data as described above, there is a case where two pieces of user preference data of which similarity degree is low before the compression indicate high similarity degree after the compression. This is a phenomenon occurring because property values of different data items having potential relativity are aggregated into one value of the topic mixing ratio by utilizing the multi-topic model. Accordingly, the potential similarity between users can be considered for the recommendation, so that the content which is more suitable for the user preference is recommended. This is similar to the case where the user preference data and the content property data are to be compared.

In the example of FIG. 6, the content property DB 44 includes two pieces of content property data for the contents C01, C02 in the data space of five dimensions of properties A to E. Meanwhile, the compressed content property DB 48 includes two pieces of compressed content property data which are respectively compressed into three dimensions. The compressed content property data are previously generated by the compression unit 34 and stored at the compressed content property DB 48. The recommendation unit 36 of FIG. 3 specifies the content as the subject for recommendation in the procedure of FIG. 7 by utilizing the compressed user preference data and the compressed content property data.

Figure 7:
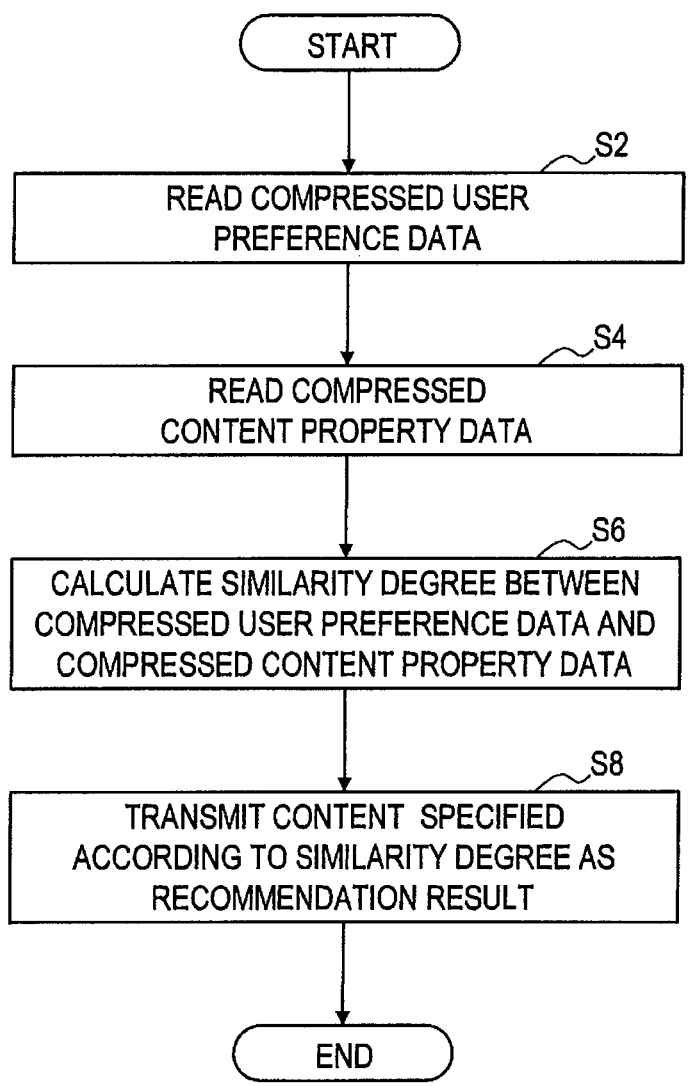
FIG. 7 is a flowchart which describes an example of the flow of a recommendation process associated with an embodiment.

FIG. 7 is a flowchart which describes an example of the flow of the recommendation process by the recommendation unit 36.

As illustrated in FIG. 7, first, the recommendation unit 36 reads the compressed user preference data of the target user for supplying the recommendation service (S2) from the compressed user preference DB 46. Next, the recommendation unit 36 read the compressed content property data from the compressed content property DB 48 (S4). The compressed content property data to be read may be a part of the data extracted by predetermined extraction conditions, for example. Next, the recommendation unit 36 calculates the similarity degree between the compressed user preference data which is read in step S2 and the compressed content property data which is read in step S4 (S6). Note that, the similarity degree may be standard inner product between the vectors, sign-reversed Euclidean distance, cosine distance or the like. Then, the recommendation unit 36 generates a list of a predetermined number of contents in a descending order of the calculated similarity degree, for example, and transmits the generated list to the terminal device 10 as the recommendation result (S8).

In the example of the above description, the recommendation unit 36 performs the recommendation process based on the content-based filtering. However, it is possible to obtain the effect of the abovementioned data compression even in a case where the recommendation unit 36 performs the recommendation process based on another algorithm such as the collaborative filtering.

Up to this point, the recommendation technology associated with an embodiment of the present invention has been described with reference to FIGS. 1 to 7. With such recommendation technology, the recommendation is performed after the dimension of the user preference data or the content property data which belongs in the high-dimensional data space is compressed in accordance with the multi-topic model. Therefore, the recommendation is preformed more suitably for the user, so that freshness and range of the recommended content can be improved.

In such related technology, the model parameters used for the compression of the user preference data or the content property data by the compression unit 34 of FIG. 3 are previously determined by learning for each data space to which the user preference data or the content property data belongs. Therefore, when the data spaces including the user preference data or the content property data are different from each other, the recommendation may not be performed by comparing the compressed data in respective data spaces with each other. On the contrary, by utilizing the learning method which will be described in the following, it becomes possible to perform cross-domain recommendation by utilizing the user preference data or the content property data of the different data spaces.

2. Description of Learning Process According to an Embodiment

Outline of Learning Apparatus

Figure 8:
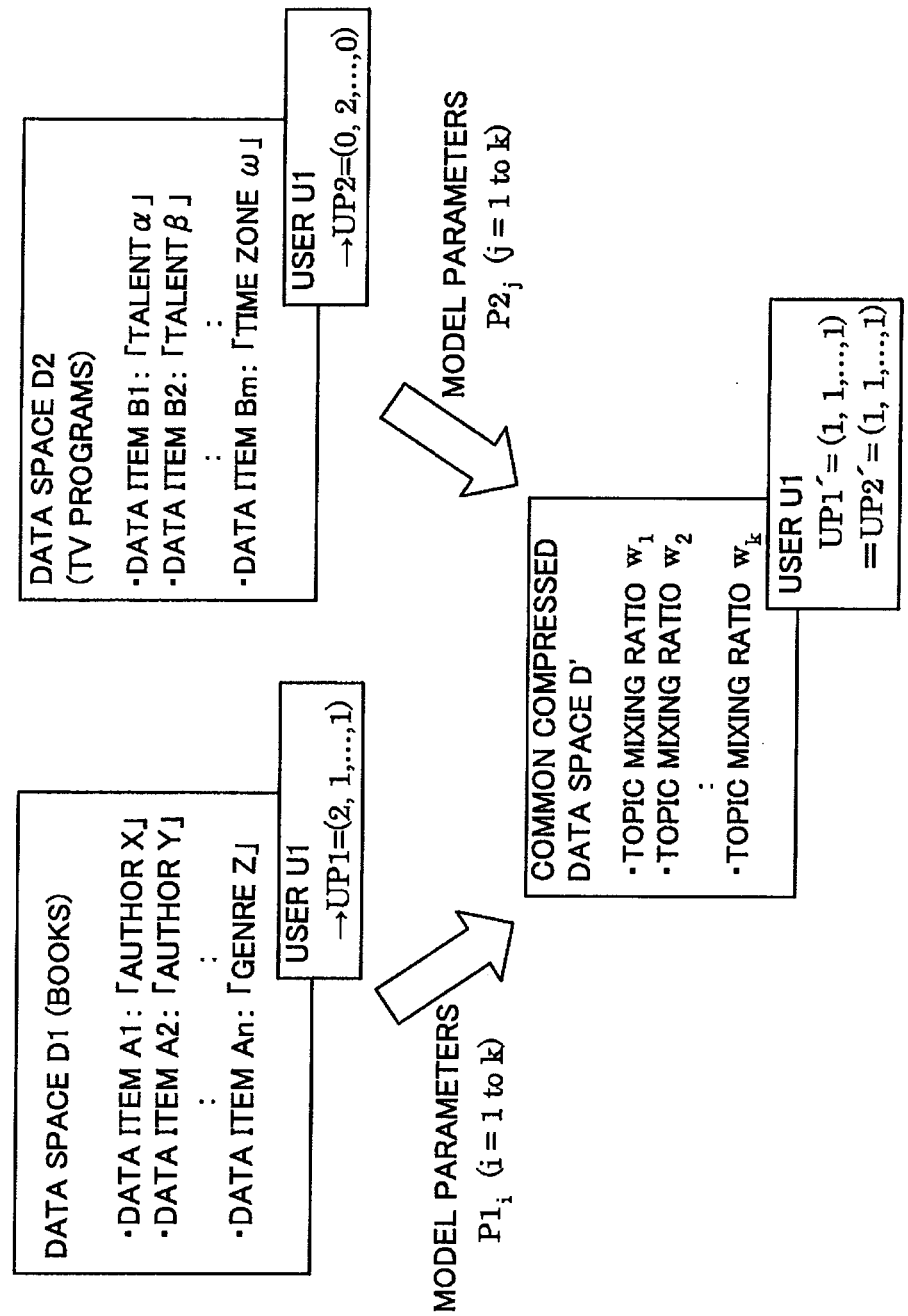
FIG. 8 is an explanatory view which illustrates an outline of a learning process according to an embodiment.

FIG. 8 is an explanatory view which illustrates an outline of a learning apparatus according to an embodiment of the present invention.

In FIG. 8, two different data spaces D1, D2 are illustrated. The data space D1 is for a content domain of books, for example. In the data space D1, n pieces of data items $A_1$-$A_n$ are included. For example, the data item $A_1$ is to be "Author X", the data item $A_2$ is to be "Author Y", . . . , and the data item $A_n$ is to be "Genre Z". Meanwhile, the data space D2 is for a content domain of television programs (TV programs), for example. In the data space D2, m pieces of data items $B_1$-$B_m$ are included. For example, the data item $B_1$ is to be "Talent $\alpha$", the data item $B_2$ is to be "Talent $\beta$", . . . , and the data item $B_m$ is to be "Time zone $\omega$".

Here, it is assumed that the user preference data of the common user U1 are respectively UP1=(2, 1, . . . , 1) and UP2=(0, 2, . . . , 0) in the data spaces D1, D2. With this assumption the dimensions of the user preference data UP1 and UP2 are different from each other and the meanings of respective elements are not associated with each other, as they are. Therefore, the user preference data UP1 and UP2 may not be directly compared to each other. Then, first, it is assumed that compressed user preference data UP1' is generated from the user preference data UP1 by utilizing the model parameters $P1_i$. Here, the dimension of the compressed user preference data UP1' corresponds to the number of the topic mixing ratios $w_1$-$w_k$, namely, the number of the model parameters $P1_i$. Meanwhile, by generating the compressed user preference data UP2' from the user preference data UP2 utilizing the same number of model parameters $P2_j$ as the model parameters $P1_i$, the dimension of the compressed user preference data UP2' is to be the same as the dimension of the compressed user preference data UP1'. Further, the model parameters $P1_i$ or the model parameters $P2_j$ are determined so as to make the sets of topic mixing ratios $w_1$-$w_k$ generated from the user preference data UP1 and UP2 equal or at least have smaller differences across a plurality of common users. As a result, it becomes possible to compare the compressed user preference data UP1' generated from the user preference data UP1 and the compressed user preference data UP2' generated from the user preference data UP2 with each other.

The learning apparatus 100 according to an embodiment described in the following determines the model parameters P2$_j$ by learning among the model parameters P1$_i$ and the model parameters P2$_j$.

[Configuration of Learning Apparatus]

Figure 9:
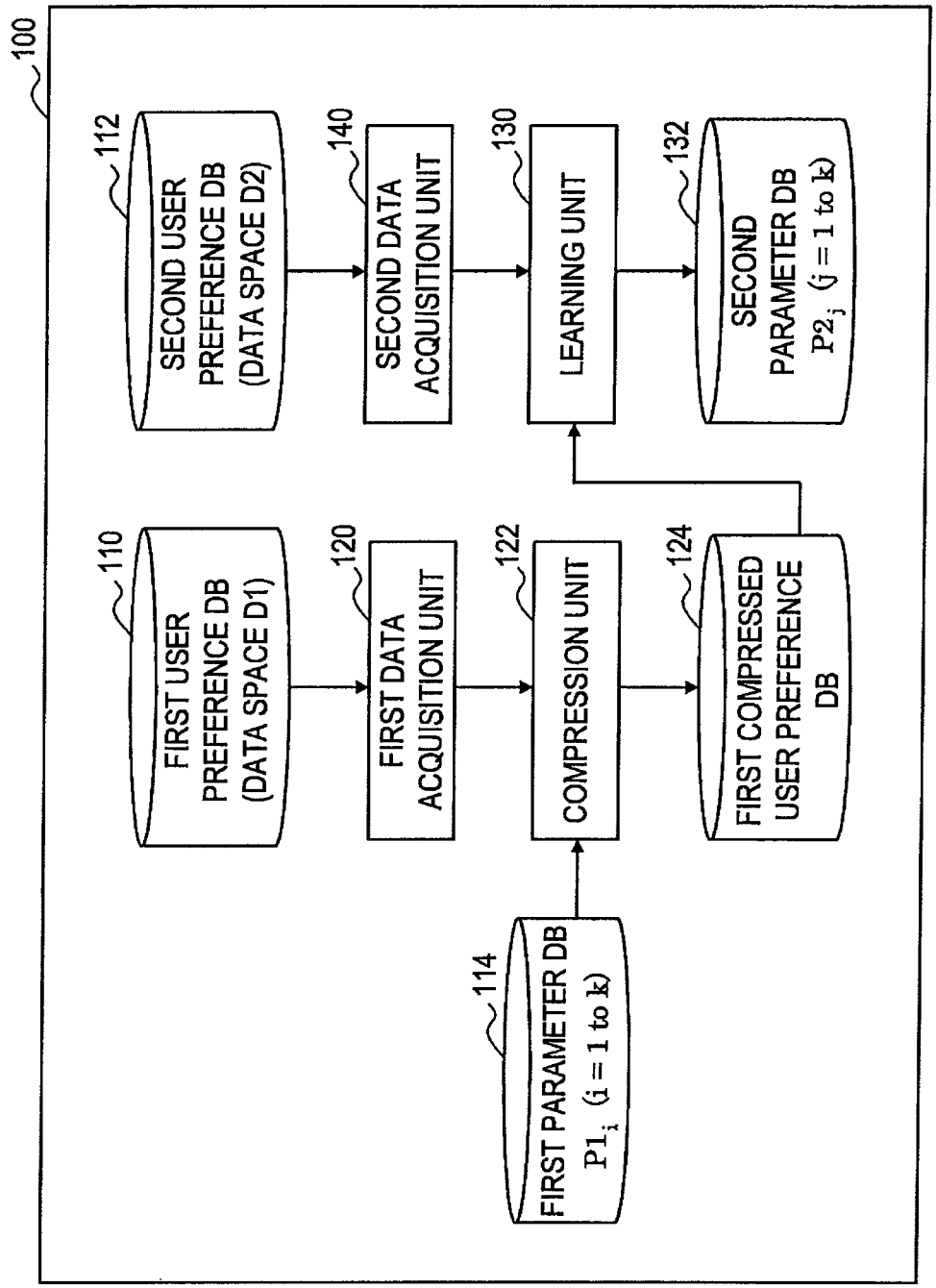
FIG. 9 is a block diagram which illustrates an example of the configuration of a learning apparatus according to an embodiment.

FIG. 9 is a block diagram which illustrates the logical configuration of the learning apparatus 100. As illustrated in FIG. 9, the learning apparatus 100 includes a first data acquisition unit 120, a compression unit 122, a learning unit 130 and a second data acquisition unit 140. Further, the learning apparatus 100 includes a first user preference DB 110, a second user preference DB 112, a first parameter DB 114, a first compressed user preference DB 124 and a second parameter DB 132.

When a learning process is performed by the learning apparatus 100, the data to be used for the learning are previously prepared respectively at the first user preference DB 110, the second data preference DB 112 and the first parameter DB 114. The first user preference DB 110 is prepared with a plurality of first user preference data which belong to the data space D1 of FIG. 8, for example. Further, the second user preference DB 112 is prepared with a plurality of second user preference data which belong to the data space D2 being different from the data space D1 for the common user with the first user preference data. Furthermore, the first parameter DB 114 is prepared with k pieces of the model parameters P1$_i$ (i=1–k) used for generating the first compressed user preference data having less data items from the first user preference data.

When the learning process with the learning apparatus 100 is started, first, the first data acquisition unit 120 acquires the first user preference data belonging to the data space D1 from the first user preference DB 110 and outputs the acquired data to the compression unit 122. Next, the compression unit 122 compresses the first user preference data by utilizing k pieces of the model parameters P1$_i$ which are prepared at the first parameter DB 114 and generates the first compressed user preference data. The first compressed user preference data generated by the compression unit 122 is stored at the first compressed user preference DB 124. The first compressed user preference data generated at that time is managed as training data of the second compressed user preference data by the later-mentioned learning unit 130.

Meanwhile, the second data acquisition unit 140 acquires the second user preference data belonging to the data space D2 from the second user preference DB 112 and outputs to the learning unit 130. Then, the learning unit 130 reads the first compressed user preference data of the common user from the first compressed user preference DB 124 and regards the first compressed user preference data as the compression result (i.e., the training data) of the case where the second user preference data is compressed. Then, the learning unit 130 determines k pieces of the model parameters P2$_j$ (j=1–k) by learning for generating the training data from the abovementioned second user preference data and stored at the second parameter DB 132. By performing such a learning process for sufficient number of users, the difference between the first compressed user preference data generated by the compression unit 122 and the second compressed user preference data can be reduced even for a new user.

Note that, in the example of the above description, the model parameters P1$_i$ for the data space D1 are fixed values and the model parameters P2$_j$ for the data space D2 are to be learned. However, it is also possible that the model parameters P1$_i$ and the model parameters P2$_j$ are simultaneously determined by learning.

3. Description of Recommendation Apparatus According to an Embodiment

By utilizing the model parameters P1$_i$ and P2$_j$ determined by the learning apparatus 100, the user preference data and the content property data belonging to different data spaces D1, D2 can be compressed into the data belonging to the common compressed data space D' as illustrated in FIG. 8. That is, it becomes possible to perform cross-domain recommendation across a plurality of domains by utilizing the user preference data or the content property data provided at different content domains. Therefore, the information processing apparatus (i.e., the recommendation apparatus) to perform recommendation of the content by utilizing the model parameter P1$_i$ and the model parameters P2$_j$ which are determined by the abovementioned learning apparatus 100 will be described in the following.

Figure 10:
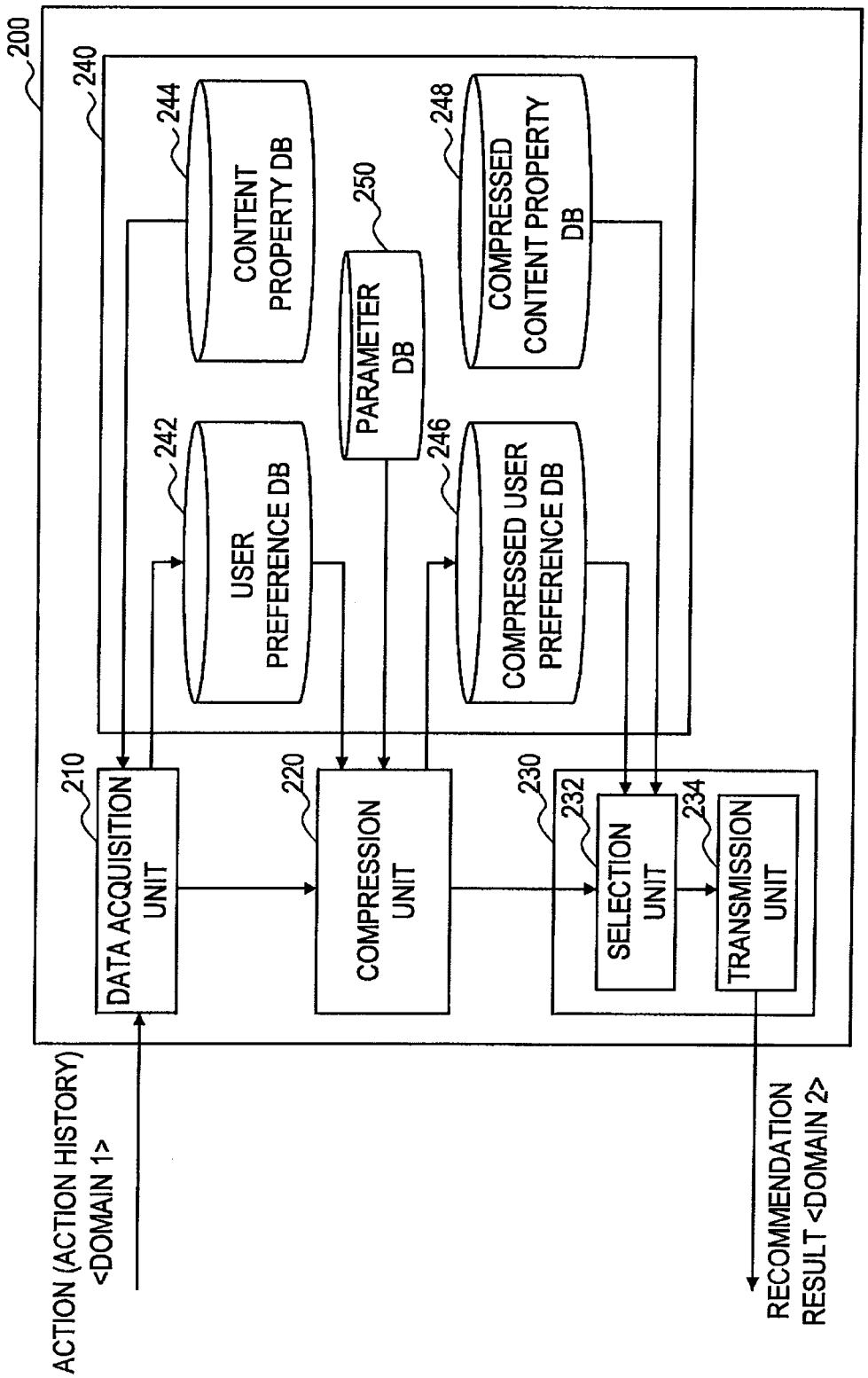
FIG. 10 is a block diagram which illustrates an example of the configuration of the information processing apparatus to perform the recommendation process according to an embodiment.

FIG. 10 is a block diagram which illustrates the logical configuration of the information processing apparatus 200 to perform the recommendation process according to an embodiment of the present invention. As illustrated in FIG. 10, the information processing apparatus 200 includes a data acquisition unit 210, a compression unit 220, a recommendation unit 230 and a storage unit 240. Then, the recommendation unit 230 includes a selection unit 232 and a transmission unit 234. Further, the storage unit 240 includes a user preference DB 242, a content property DB 244, a compressed user preference DB 246, a compressed content property DB 248 and a parameter DB 250.

The data acquisition unit 210 acquires the first user preference data belonging to the data space D1 which corresponds to the first content domain. More specifically, the data acquisition unit 210 may calculate and acquire the first user preference data by utilizing the first content property data which is previously stored at the content property DB 244, for example, based on the action or the action history of the user regarding the first content domain. Instead, the data acquisition unit 210 may acquire the previously-calculated first user preference data from an internal or external database of the information processing apparatus 200 and the like. The data acquisition unit 210 stores the acquired first user preference data at the user preference DB 242.

The compression unit 220 generates the first compressed user preference data having less number of data items from the first user preference data by utilizing the first set of parameters. More specifically, the compression unit 220 may generate the first compressed user preference data in accordance with the concept of the multi-topic model described with reference to FIG. 5, for example, by utilizing the first set of model parameters P1$_i$ stored at the parameter DB 250. The compression unit 220 stores the generated first compressed user preference data at the compressed user preference DB 246.

The second compressed user preference data regarding a plurality of users generated from the second data preference data belonging to the data space D2 being different from the data space D1 by utilizing the second set of model parameters P2$_j$ are previously stored at the compressed user preference DB 246 of the storage unit 240. Further, the second compressed content property data regarding a plurality of contents generated from the second content property data belonging to the data space D2 by utilizing the second set of model parameters P2$_j$ are previously stored at the compressed content property DB 248. Here, the second set of model parameters $P2_j$ utilized for generating the second compressed user preference data and the second compressed content property data is the set of parameters which is previously learned so that the difference between the first compressed user preference data and the second compressed user preference data is to be small across the plurality of users.

The selection unit 232 of the recommendation unit 230 selects at least single data from among the abovementioned plurality of the second compressed user preference data or the second compressed content property data according to the similarity degree to the first compressed user preference data generated by the compression unit 220. More specifically, the selection unit 232 may select the second compressed content property data having high similarity degree to the first compressed user preference data generated by the compression unit 220, for example, in accordance with the concept of content-based filtering. Here, the similarity degree may be calculated as standard inner product between the vectors, sign-reversed Euclidean distance, cosine distance or the like, for example. Then, the selection unit 232 outputs a content identifier and the like corresponding to at least one of the selected compressed content property data to the transmission unit 234. Further, the selection unit 232 may select the second compressed user preference data having high similarity degree to the first compressed user preference data generated by the compression unit 220, for example, in accordance with the concept of collaborative filtering. In this case, the selection unit 232 outputs a content identifier and like specifying a content used in the past by the user corresponding to the second compressed user preference data selected by the selection unit 232, for example.

The transmission unit 234 generates the recommendation result (i.e., a content identifier list, a webpage displaying the recommendation result or the like), for example, in accordance with the content identifier inputted from the selection unit 232 and transmits the generated result to an external device such as the terminal device 10 of FIG. 1.

As conceived with the above description, the information processing apparatus 200 can recommend a content of the second content domain corresponding to the data space D2 by utilizing the first user preference data in the data space D1 corresponding to the first content domain. This recommendation process is performed by learning the model parameters capable of compressing the data in the two different data spaces D1, D2 into the data in the common compressed data space D'. With this recommendation process by the information processing apparatus 200, it becomes possible to recommend the content suitable for the user in a cross-domain manner across a variety of content domains such as music, video, books and news articles, for example.

The data spaces D1, D2 are not limited to data spaces corresponding to different content domains. Namely, for example, the data spaces D1, D2 may be data spaces having different data items defined for the same content domain. For example, in a case where types or manufacturing vendors of devices such as PCs and music players which generate the user preference data are different, the data spaces of the user preference data may be considered to be different even with the user preference data in the same music domain. In this case also, with the information processing apparatus 200 according to the present embodiment, it becomes possible to perform the recommendation based on the user preference data generated at a data space by utilizing the user preference data or the content property data belonging to another data space.

4. Description of Data Accumulation Apparatus According to an Embodiment

Further, when the model parameters $P1_i$, $P2_j$ determined by the learning apparatus 100 are utilized, the user preference data and the content property data generated in the different data spaces D1, D2 can be accumulated as being compressed into the data in the common compressed data space D'. Accordingly, the user preference data dispersed as the data in different data spaces at various devices can be accumulated at the single data accumulation apparatus so that the process result of the recommendation process is improved in accuracy. Then, the information processing apparatus (i.e., the data accumulation apparatus) capable of accumulating the user preference data generated at the plurality of devices as the data of the single compressed data space by utilizing the model parameters which are determined by the abovementioned learning apparatus 100 will be described in the following.

Figure 11:
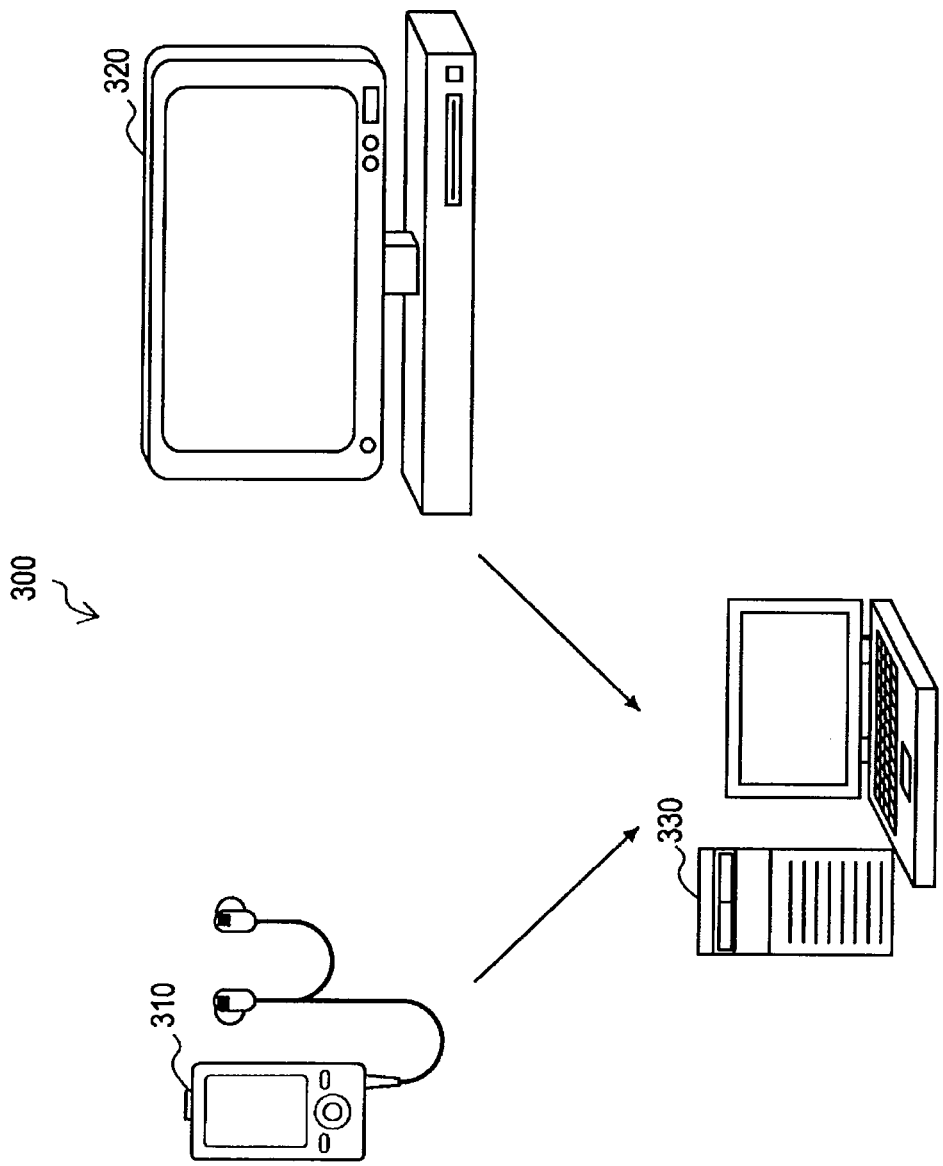
FIG. 11 is a schematic view which illustrates an outline of a system to perform a data accumulation process according to an embodiment.

FIG. 11 is a schematic view which illustrates an outline of an information processing system 300 utilizing the data accumulation apparatus according to an embodiment of the present invention. As illustrated in FIG. 11, the information processing system 300 includes terminal devices 310, 320 and an information processing apparatus 330.

A music player is illustrated in FIG. 11 as an example of the terminal device 310. However, not limited to this example, the terminal device 310 may be an arbitrary device. Similarly, a television set is illustrated as an example of the terminal device 320. However, not limited to this example, the terminal device 320 may be an arbitrary device. The terminal devices 310, 320 respectively generate user preference data belonging to different data spaces and transmit the generated data to the information processing apparatus 330.

Figure 12:
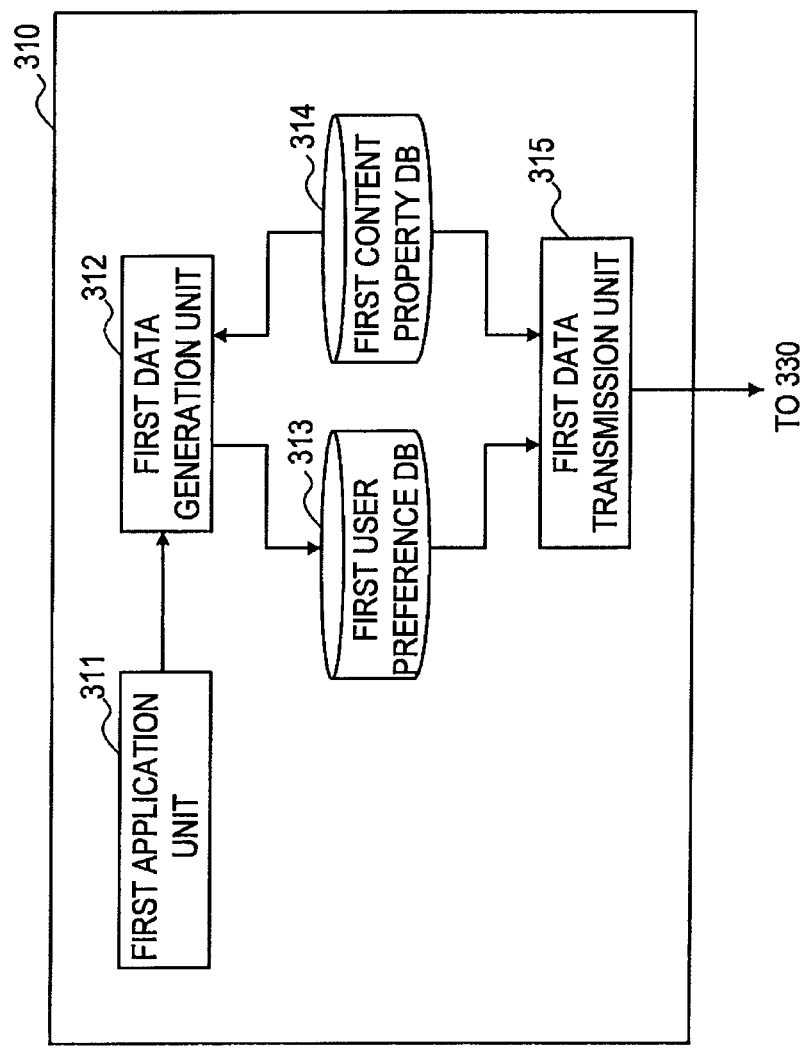
FIG. 12 is a block diagram which illustrates an example of a specific configuration of the terminal device of FIG. 11.

FIG. 12 is a block diagram which illustrates the logical configuration of the terminal device 310. As illustrated in FIG. 12, the terminal device 310 includes a first application unit 311, a first data generation unit 312, a first user preference DB 313, a first content property DB 314 and a first data transmission unit 315.

The first application unit 311 manages the content which is to be a subject of the user's action using the terminal device 310. Namely, the later-mentioned first user preference data is generated in accordance with the user's action such as replay or execution of the content utilizing the first application unit 311. The information regarding the user's action utilizing the first application unit 311 is outputted to the first data generation unit 312.

When the information regarding the abovementioned user's action is received from the first application unit 311, the first data generation unit 312 generates the first user preference data belonging to the first data space by utilizing the first content property data previously stored at the first content property DB 314. The first data space is, for example, the data space corresponding to the music domain in the case where the first application unit 311 is the application for music replay. The generation process of the first user preference data by the first data generation unit 312 may be the process in accordance with the content-based filtering described with reference to FIG. 4, for example. The first data generation unit 312 stores the generated first user preference data at the first user preference DB 313.

The first data transmission unit 315 acquires the first user preference data generated by the first data generation unit 312 from the first user preference DB 313, for example, and transmits the acquired data to the information processing apparatus 330 of FIG. 11. Further, the first data transmission unit 315 may transmits, to the information processing apparatus 330, the first content property data belonging to the first data space acquired from the first content property DB 314. The data transmission process to the information processing apparatus 330 by the first data transmission unit 315 may be performed, for example, when a user uses the first application unit 311 or at previously determined specific time intervals.

Figure 13:
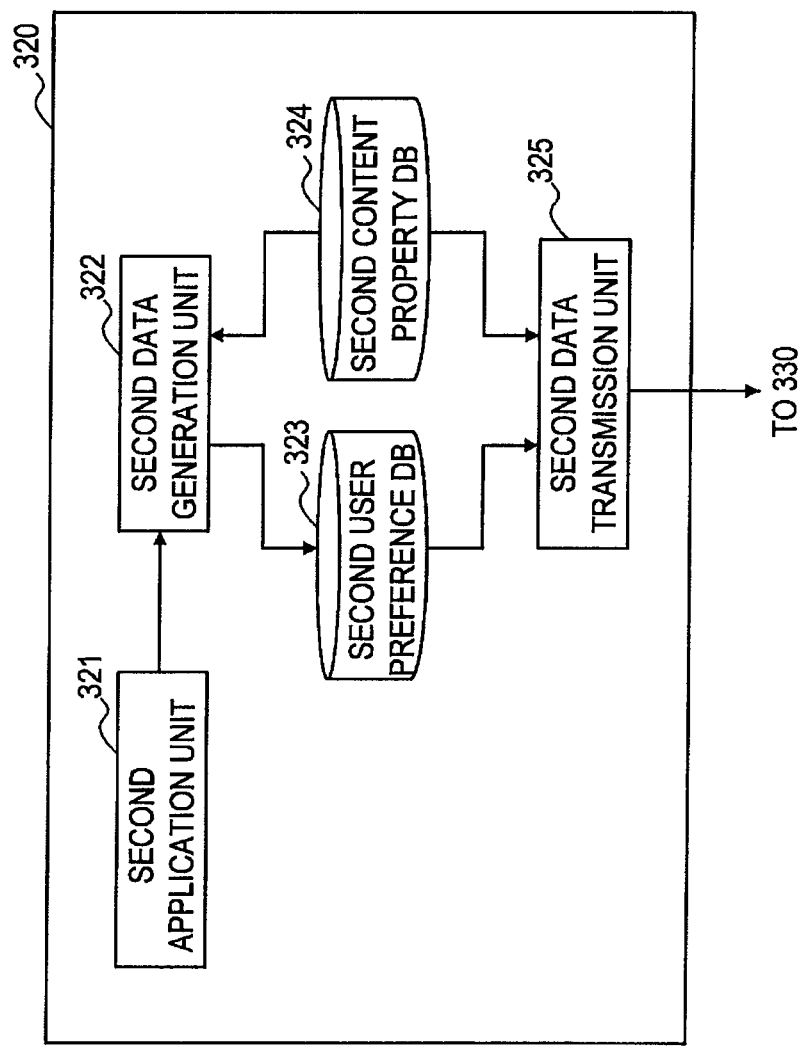
FIG. 13 is a block diagram which illustrates an example of a specific configuration of the other terminal device of FIG. 11.

FIG. 13 is a block diagram which illustrates the logical configuration of the terminal device 320. As illustrated in FIG. 13, the terminal device 320 includes a second application unit 321, a second data generation unit 322, a second user preference DB 323, a second content property DB 324 and a second data transmission unit 325.

The second application unit 321 manages the content which is to be a subject of the user's action using the terminal device 320. Namely, the later-mentioned second user preference data is generated in accordance with the user's action such as replay or execution of the content utilizing the second application unit 321. The information regarding the user's action utilizing the second application unit 321 is outputted to the second data generation unit 322.

When the information regarding the abovementioned user's action is received from the second application unit 321, the second data generation unit 322 generates the second user preference data belonging to the second data space by utilizing the second content property data previously stored at the second content property DB 324. The second data space is, for example, the data space corresponding to a television program domain in the case where the second application unit 321 is a television set to display television programs. The generation process of the second user preference data by the second data generation unit 322 may be the process in accordance with the content-based filtering described with reference to FIG. 4, for example. The second data generation unit 322 stores the generated second user preference data at the second user preference DB 323.

The second data transmission unit 325 acquires the second user preference data generated by the second data generation unit 322 from the second user preference DB 323, for example, and transmits the acquired data to the information processing apparatus 330 of FIG. 11. Further, the second data transmission unit 325 may transmit, to the information processing apparatus 330, the second content property data belonging to the second data space acquired from the second content property DB 324. Similarly to the transmission process by the above-mentioned first data transmission unit 315, the data transmission process to the information processing apparatus 330 by the second data transmission unit 325 may be performed, for example, when a user uses the second application unit 321 or at previously determined specific time intervals.

Figure 14:
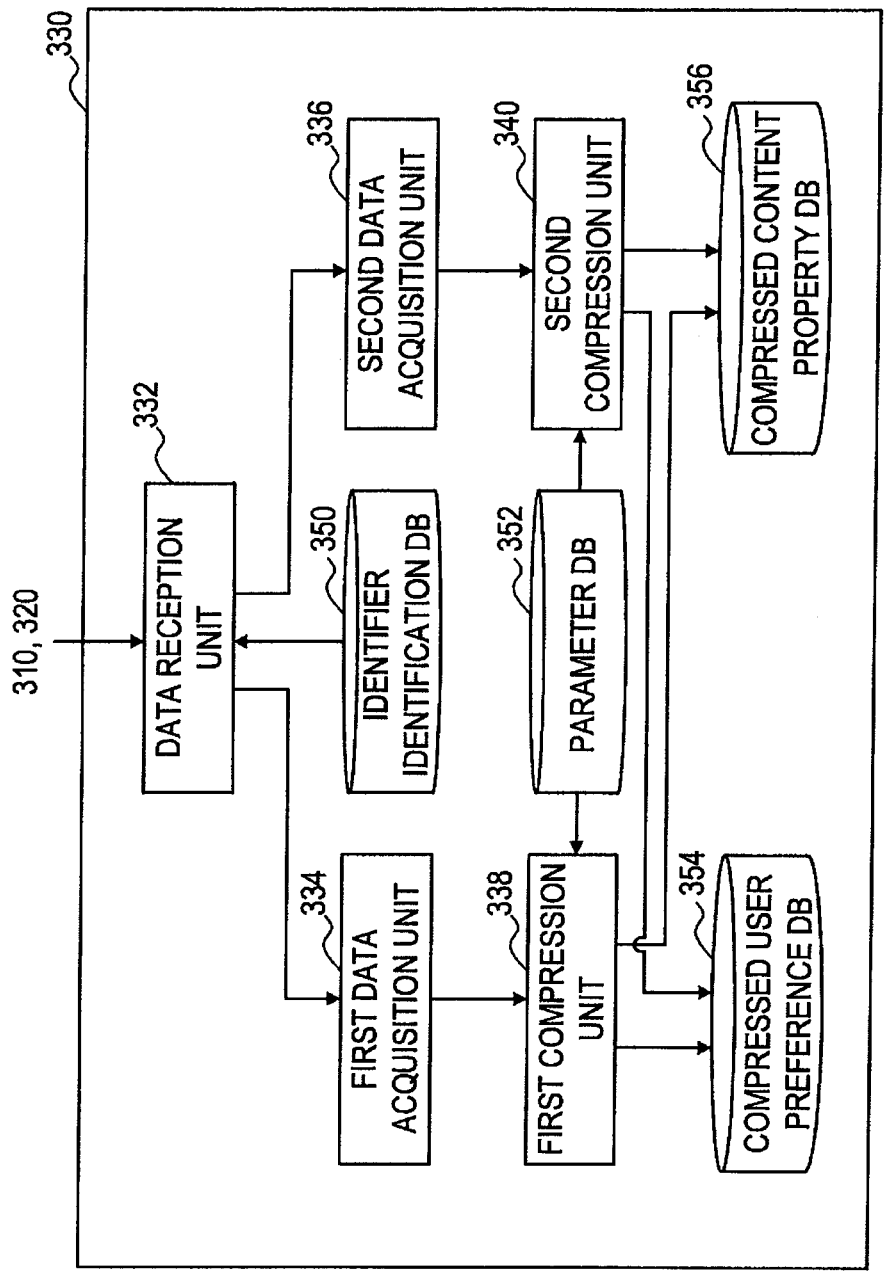
FIG. 14 is a block diagram which illustrates an example of a specific configuration of the information processing apparatus of FIG. 11.

FIG. 14 is a block diagram which illustrates the logical configuration of the information processing apparatus 330. As illustrated in FIG. 14, the information processing apparatus 330 includes a data reception unit 332, a first data acquisition unit 334, a second data acquisition unit 336, a first compression unit 338 and a second compression unit 340. Further, the information processing apparatus 330 includes an identifier identification DB 350, a parameter DB 352, a compressed user preference DB 354 and a compressed content property DB 356.

The data reception unit 332 receives the user preference data or the content property data transmitted from the terminal device 310 and the terminal device 320 which are described above. Herein, the user identifiers contained in the user preference data or the content identifiers contained in the content property data transmitted from the terminal device 310 and the terminal device 320 are not always unified between the terminal devices. Accordingly, the data reception unit 332 identifies the user or the content to be related to the received data by utilizing an identifier correspondence table which is previously stored at the identifier identification DB 350. Then, the data reception unit 332 outputs the received data to the first data acquisition unit 334 or the second data acquisition unit 336 in accordance with the data space corresponding to the identified user or content.

The first data acquisition unit 334 acquires the first user preference data or the first content property data belonging to the first data space among the data received by the data reception unit 332 and outputs to the first compression unit 338. Meanwhile, the second data acquisition unit 336 acquires the second user preference data or the second content property data among the data received by the data reception unit 332 and outputs to the second compression unit 340.

The first compression unit 338 generates the first compressed user preference data having less data items, for example, from the first user preference data inputted by the first data acquisition unit 334 by utilizing the first set of parameters which are previously stored at the parameter DB 352. Then, the first compression unit 338 outputs the first compressed user preference data generated thereby to the compressed user preference DB 354 for storing. In addition, the first compression unit 338 may compress and store the first content property data inputted from the first data acquisition unit 334 at the compressed content property DB 356.

The second compression unit 340 generates the second compressed user preference data having less data items, for example, from the second user preference data inputted by the second data acquisition unit 336 by utilizing the second set of parameters which are previously stored at the parameter DB 352. Then, the second compression unit 340 outputs the second compressed user preference data generated thereby to the compressed user preference DB 354 for storing. In addition, the second compression unit 340 may compress and store the second content property data inputted from the second data acquisition unit 336 at the compressed content property DB 356.

Here, the first and second sets of parameters which are previously stored at the parameter DB 352 correspond to, for example, the model parameters and the like of the multi-topic model determined through the learning process by the above-mentioned learning apparatus 100. Namely, the first and second sets of parameters according to the present embodiment are learned so that the difference between the first compressed user preference data and the second compressed user preference data of the common user becomes small across a plurality of users. Accordingly, with the information processing apparatus 330 according to the present embodiment, the data generated respectively by the terminal devices 310, 320 can be accumulated at each database as the data belonging to the common compressed data space. Here, it is also possible to calculate the third compressed user preference data by summing the first compressed user preference data and the second compressed user preference data of the common user after being multiplied by a predetermined ratio and to store the third compressed user preference data at the database. The ratio to be multiplied to the first compressed user preference data and the second compressed user preference data may be determined in accordance with the number of histories contained in the user history for each device, for example. In this manner, by accumulating the user preference data and the content property data as the data in the common compressed data space, the dispersed data at various devices are aggregated into the single database to be utilized effectively so that the accuracy of the recommendation process utilizing the data can be improved.

It should be noted that, in the example of the above description, the terminal device 310 and the terminal device 320 are of different types. However, the effects of the data accumulation by the information processing apparatus 330 can be also expected even in the case where the data spaces of the user preference data and the like are different due to different vendors and handling languages for the terminal devices 310, 320 of the same type, for example.

5. Description of Data Conversion Apparatus According to an Embodiment

The model parameters $P1_i$ and $P2_j$ determined by the learning apparatus 100 may be also considered to indicate features in the common compressed data space of the data items constituting each data space. Therefore, when the parameter values of the model parameters $P1_i$ and $P2_j$ corresponding to two data items which belong to the different data spaces are similar to each other, the two data items are considered to have similarity therebetween. Accordingly, the user preference data or the content property data generated in a data space can be mapped with the data belonging to another data space based on the model parameters $P1_i$, $P2_j$ which are determined by the learning apparatus 100. Thus, it is possible to circulate or reuse the user preference data or the content property data by mutually converting in the different data spaces. Consequently, it is possible to increase opportunities of providing the recommendation service, for example. Therefore, the information processing apparatus (i.e., the data conversion apparatus) capable of converting the user preference data or the content property data generated in a data space into the data belonging to another data space will be described in the following.

Figure 15:
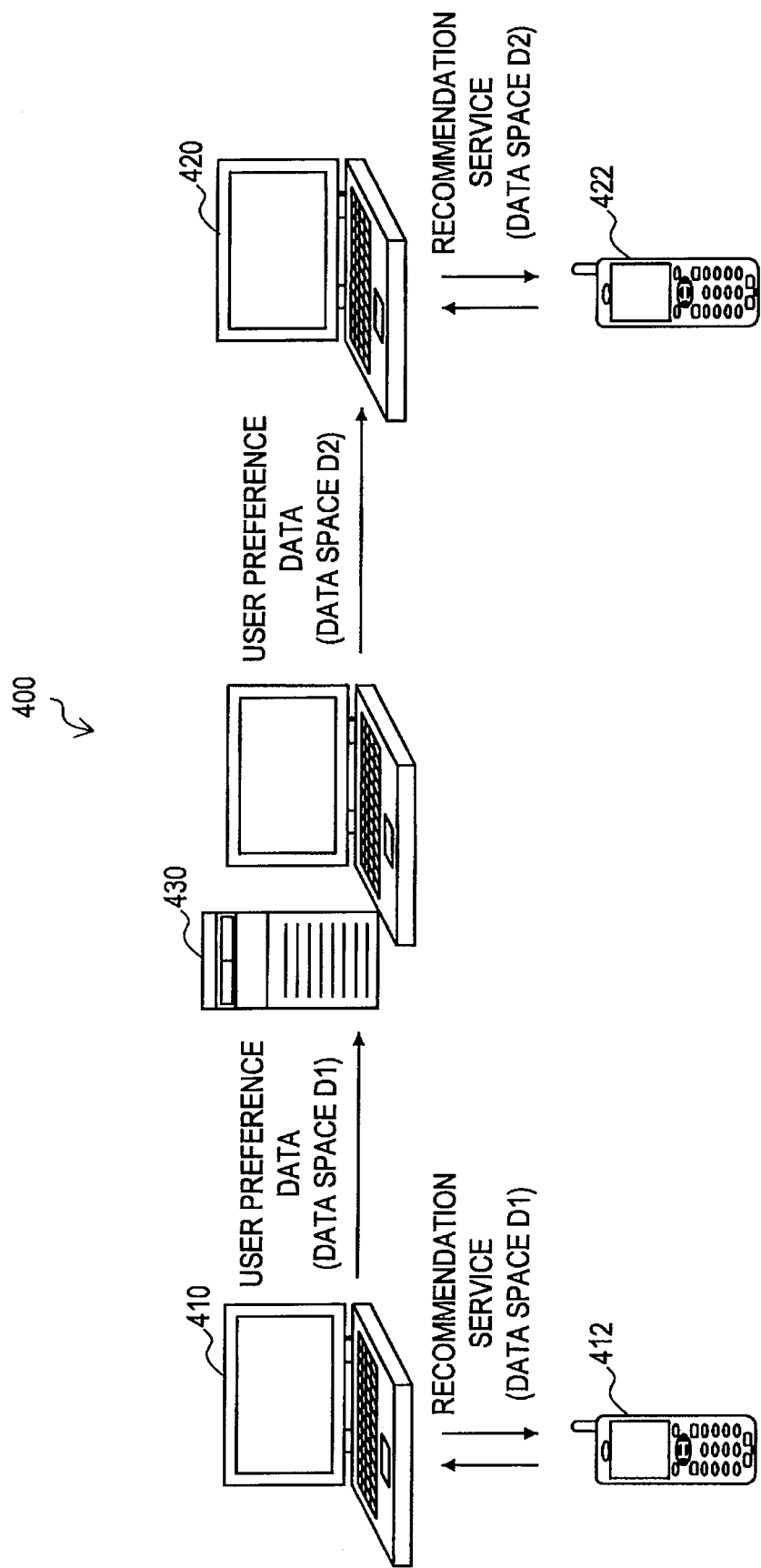
FIG. 15 is a schematic view which illustrates an outline of the system to perform a data conversion process according to an embodiment.

FIG. 15 is a schematic view which illustrates an outline of an information processing system 400 utilizing the data conversion apparatus according to an embodiment of the present invention. As illustrated in FIG. 15, the information processing apparatus 400 includes recommendation devices 410, 420, terminal devices 412, 422 and an information processing apparatus 430.

The recommendation device 410 provides the recommendation service to the terminal device 412 by utilizing the first content property data and the first user preference data belonging to the data space D1. The terminal device 412 receives the recommendation result of the content of the corresponding domain to the data space D1 from the recommendation device 410 and proposes to the user.

Meanwhile, the recommendation device 420 provides the recommendation service to the terminal device 422 by utilizing the second content property data and the second user preference data belonging to the data space D2 which is different from the data space D1. The terminal device 422 receives the recommendation result of the content of the corresponding domain to the data space D2 from the recommendation device 420 and proposes the received result to the user.

Between these two recommendation devices 410, 420, the information processing apparatus 430 converts the first user preference data belonging to the first data space into the second user preference data belonging to the second data space which is different from the first data space.

Figure 16:
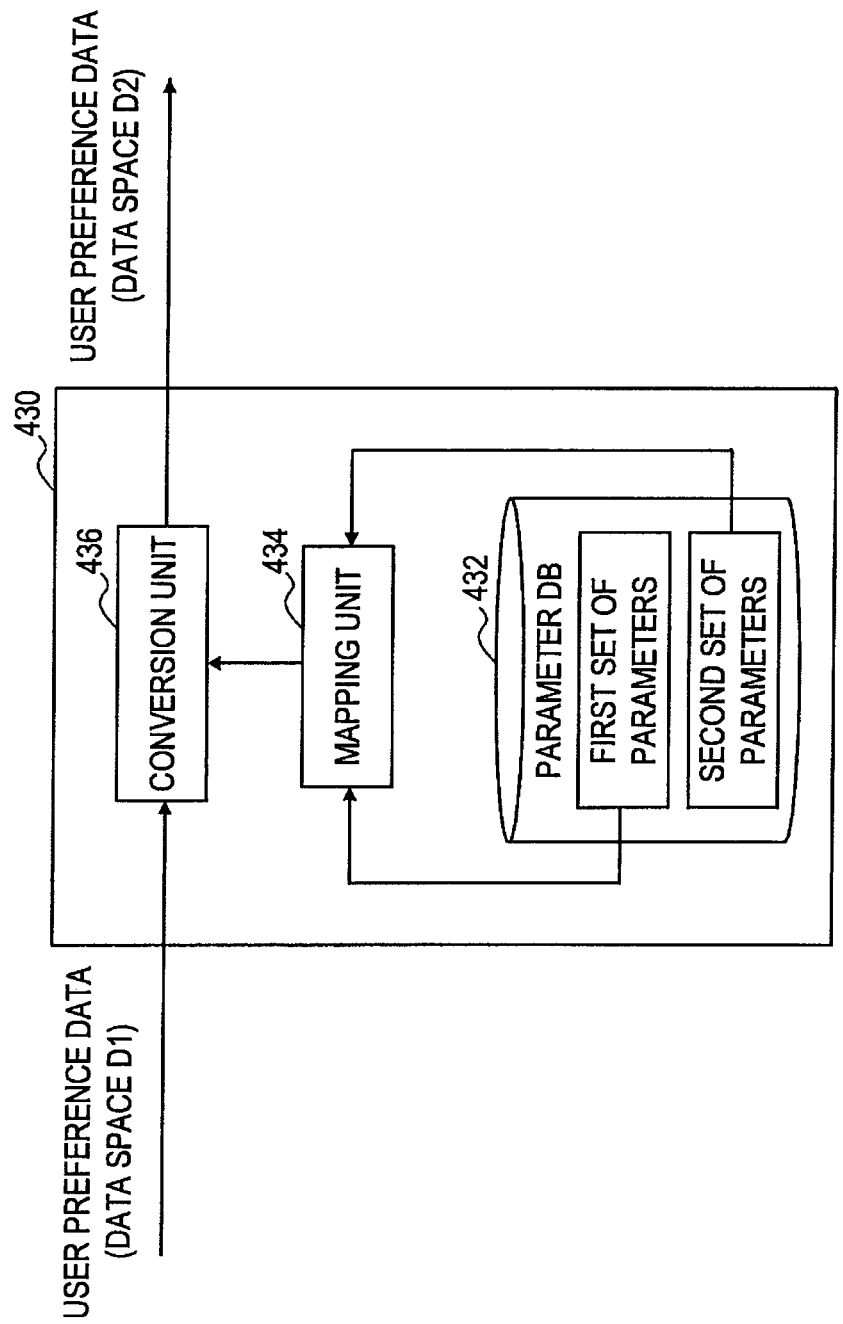
FIG. 16 is a block diagram which illustrates an example of a specific configuration of the information processing apparatus of FIG. 15.

FIG. 16 is a block diagram which illustrates an example of the logical configuration of the information processing apparatus 430. As illustrated in FIG. 16, the information processing apparatus 430 includes a parameter DB 432, a mapping unit 434 and a conversion unit 436.

The parameter DB 432 stores the first set of parameters to generate the first compressed user preference data from the first user preference data belonging to the data space D1 and the second set of parameters to generate the second compressed user preference data from the second user preference data belonging to the data space D2. The first and second sets of parameters are learned by utilizing the abovementioned learning apparatus 100 so that the difference between the first compressed user preference data and the second compressed user preference data of the common user becomes small across a plurality of users. The first and second sets of parameters may be respectively the model parameters in accordance with the multi-topic model.

The mapping unit 434 determines the correspondence between the data items of the first user preference data and the data items of the second user preference data according to the similarity degree of the parameter values for respective data items of the abovementioned first and second sets of parameters acquired from the parameter DB 432.

Figure 17:
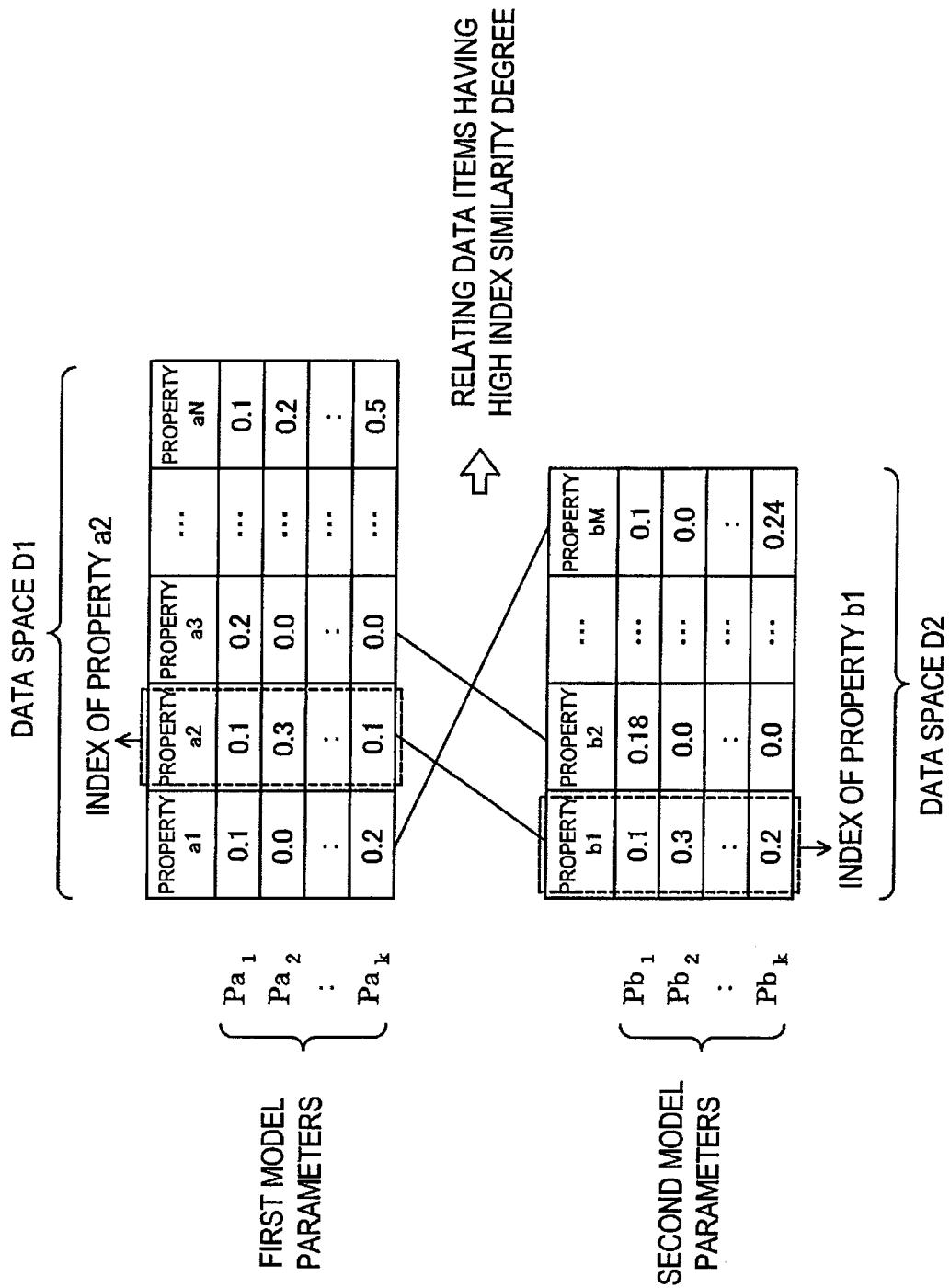
FIG. 17 is an explanatory view which illustrates a determination process of correspondence among data items.

FIG. 17 is an explanatory view which illustrates a determination process of the correspondence by the mapping unit 434.

Properties a1-aN as the data items of the data space D1 and properties b1-bN as the data items of the data space D2 are indicated in FIG. 17. Further, the first model parameters $Pa_i$ (i=1-k) and the second model parameters $Pb_j$ (j=1-k) determined by the abovementioned learning in the data spaces D1, D2 are indicated as well.

In FIG. 17, focusing on property a2 of the data space D1, for example, the feature related to the common compressed data space of property a2 is indicated by the vector (0.1, 0.3, . . . , 0.1) having k pieces of parameter values of the first model parameters Pa, as the elements thereof. In this specification, the vector of which elements are parameter values of the model parameters in the case of focusing on a specific data item is called the index of the data item. Accordingly, the indexes of N pieces of the data items are acquired for the N-dimensional data space D1 and the indexes of M pieces of the data items are acquired for the M-dimensional data space D2.

The mapping unit 434 acquires the indexes for each data item from the two different data spaces D1, D2 and calculates the index similarity degree of respective data items. For example, the index similarity degree may be standard inner product between the vectors, sign-reversed Euclidean distance, cosine distance or the like. Then, for each data item of the data space D2, for example, the mapping unit 434 respectively determines the data item of the data space D1 having the highest index similarity degree.

In the example of FIG. 17, the data item of the data space D1 having the highest similarity degree to property b1 of the data space D2 is property a2, for example. The data item of the data space D1 having the highest similarity with property b2 of the data space D2 is property a3. Further, the data item of the data space D1 having the highest similarity degree to property bM of the data space D2 is property a1. The mapping unit 434 outputs, to the conversion unit 436, the above-determined correspondence between data items from the data space D1 to the data space D2, for example.

The conversion unit 436 converts the first user preference data received from the recommendation device 410 of FIG. 15, for example, into the second user preference data in accordance with the correspondence of the data items of the data spaces D1, D2 determined by the mapping unit 434.

Figure 18:
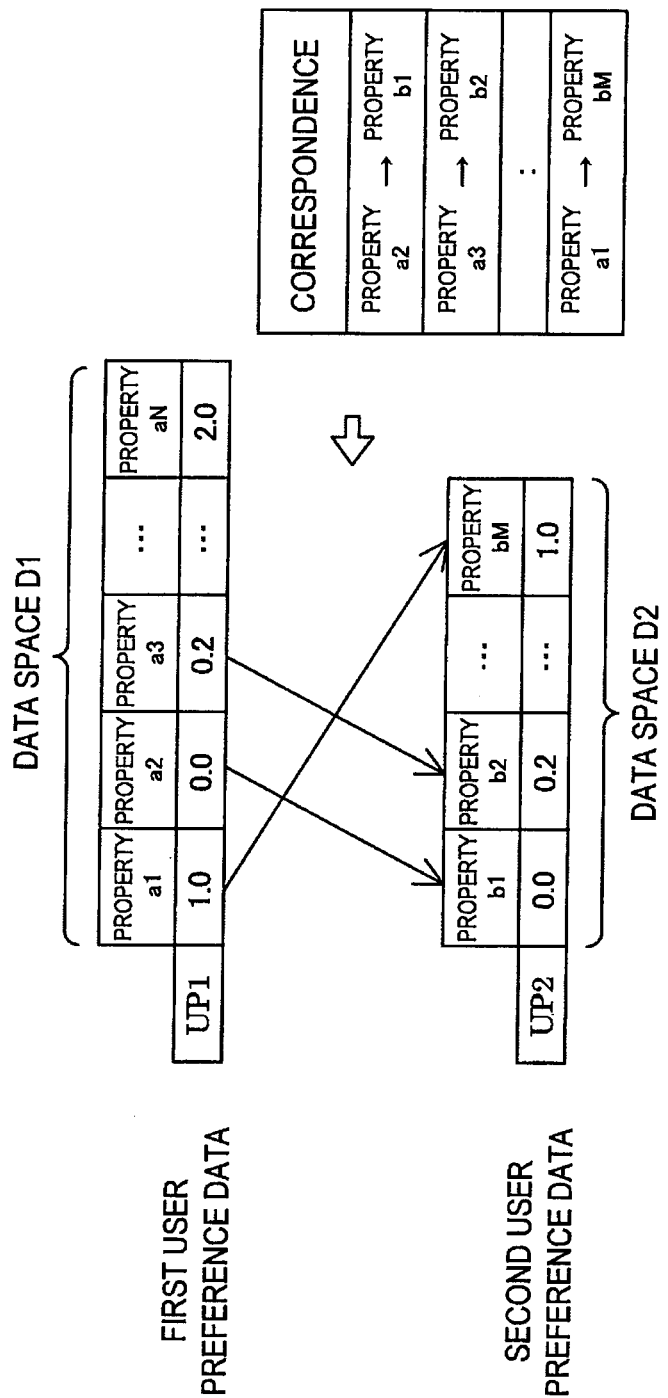
FIG. 18 is an explanatory view which illustrates a conversion process of the user preference data.

FIG. 18 is an explanatory view which describes the data conversion process by the conversion unit 436.

The correspondence of the data items of the data spaces D1, D2 determined by the mapping unit 434 is indicated in FIG. 18. Here, property a2 of the data space D1 is related to property b1 of the data space D2, property a3 of the data space D1 is related to property b2 of the data space D2, and property a1 of the data space D1 is related to property bM of the data space D2. Further, the first user preference data UP1 received from the recommendation device 410 of FIG. 15, for example, is indicated in FIG. 18 as well. Here, the first user preference data UP1 is indicated as (1.0, 0.0, 0.2, . . . , 2.0).

The conversion unit 436 sequentially acquires the data values corresponding to properties b1, b2, . . . , bM from the first user preference data UP1, for example, in accordance with the correspondence indicated in FIG. 18 and generates the second user preference data UP2. In this case, the first user preference data UP2 is to be (0.0, 0.2, . . . , 1.0) in accordance with the abovementioned correspondence. The second user preference data UP2 converted by the conversion unit 436 is outputted to the recommendation device 420 of FIG. 15, for example.

Provided that the user preference data are able to be mutually converted between the different data spaces as described above, it is allowed to circulate or reuse the user preference data possibly generated in various data spaces among devices or systems. At this point, it is not necessary to modify an existing application or database which is mounted on each device or system. Therefore, it becomes possible to increase opportunities of providing the recommendation service by utilizing the application or database without requiring additional cost.

Modified Example

Figure 19:
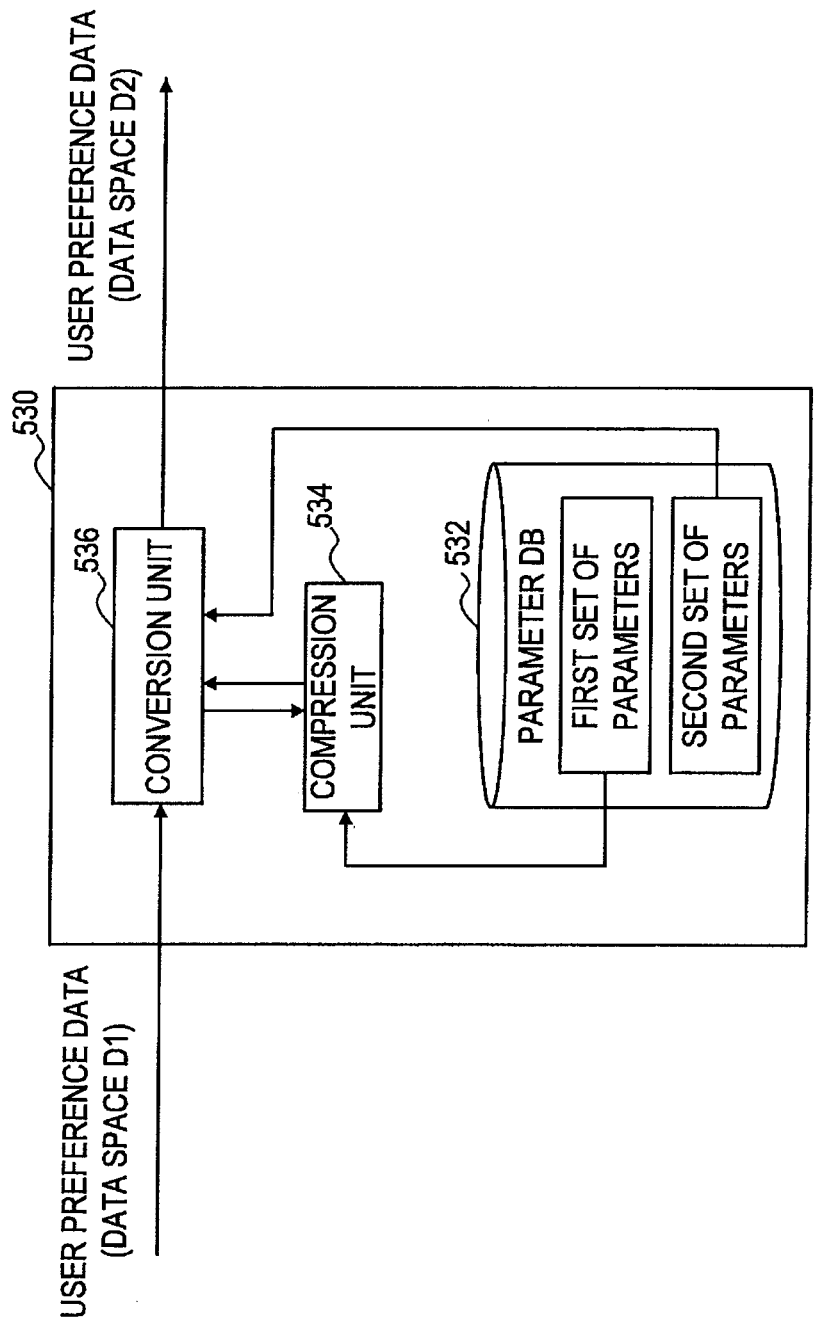
FIG. 19 is a block diagram which illustrates a specific configuration according to a modified example of a data conversion apparatus.

FIG. 19 is a block diagram which illustrates the logical configuration of an information processing apparatus 530 according to a modified example of the data conversion apparatus. As illustrated in FIG. 19, the information processing apparatus 530 includes a parameter DB 532, a compression unit 534 and a conversion unit 536.

Similarly to the parameter DB 432 of FIG. 16, the parameter DB 532 stores the first and second sets of parameters. The first and second sets of parameters are learned by utilizing the abovementioned learning apparatus 100. The first and second sets of parameters may be respectively the model parameters in accordance with the multi-topic model.

The compression unit 534 generates the first compressed user preference data from the first user preference data inputted from the conversion unit 536 by utilizing the abovementioned first set of parameters acquired from the parameter DB 532. Then, the compression unit 534 outputs the generated first compressed user preference data to the conversion unit 536.

When the first compressed user preference data is generated by the compression unit 534, the conversion unit 536 determines a likely second user preference data capable of generating the second compressed user preference data which is equal to the first compressed user preference data by utilizing the second set of parameters stored at the parameter DB 532. More specifically, for example, the conversion unit 536 generates, by the predetermined number of trials, the second user preference data capable of generating the second compressed user preference data which is equal to the first compressed user preference data in accordance with the probability distribution of equation 1. Here, it is preferable that the predetermined number of trials is set to be large as the absolute value of the regarded vector of the first user preference data is large. The conversion unit 536 may output the second user preference data, for example, which is determined as mentioned above as the conversion result of the user preference data.

6. Summary

Up to this point, the learning apparatus, the recommendation apparatus, the data accumulation apparatus and the data conversion apparatus according to embodiments of the present invention have been described in detail with reference to FIGS. 8 to 19. With these embodiments, it becomes possible to commonly manage user preferences and content properties among domains of different data spaces. Accordingly, the benefits of performing cross-domain recommendation, accuracy improving of recommendation result, opportunity increasing of recommendation service providing and the like are advantageously expected.

Note that, the series of processes according to each embodiment described in this specification may be performed no matter by hardware or software. In the case where the series of or a part of processes is performed by software, programs constituting the software are executed by utilizing a computer mounted into a specific hardware or a general purpose computer of FIG. 20, for example.

Figure 20:
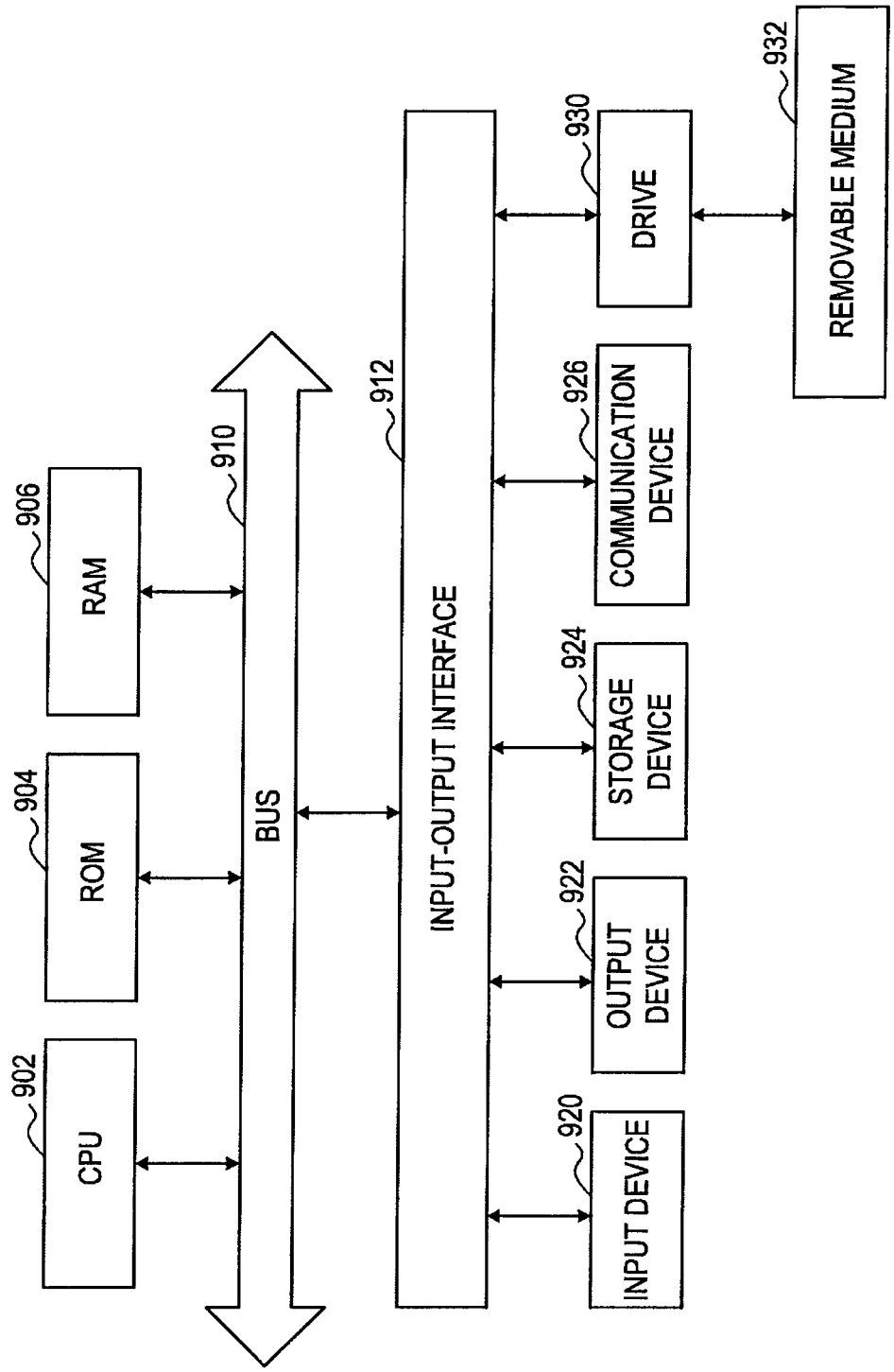
FIG. 20 is a block diagram which illustrates a hardware configuration of a general purpose computer.

In FIG. 20, a central processing unit (CPU) 902 controls overall operation of the general purpose computer. A read only memory (ROM) 904 stores programs or data in which a part or the whole of the series of processes are described. A random access memory (RAM) 906 temporally stores the program or data which is used by the CPU 902 at the time of process execution.

The CPU 902, the ROM 904 and the RAM 906 are mutually connected via a bus 910. In addition, an input-output interface 912 is connected to the bus 910.

The input-output interface 912 connects the CPU 902, the ROM 904 and the RAM 906 with an input device 920, an output device 922, a storage device 924, a communication device 926 and a drive 930.

The input device 920 receives an instruction or an information input from a user via an input instrument such as a mouse, a keyboard, a touch panel, a button and a switch, for example. The output device 922 outputs information to the user via a display instrument such as CRT, PDP, LCD and OLED or an audio output instrument such as a speaker.

The storage device 924 is configured with a hard disk drive, a flash memory or the like, for example, and stores programs and data. The communication device 926 performs a communication process via a network such as a LAN and the internet. The drive 930 is arranged at the general purpose computer as needed. For example, a removable medium 932 is mounted to the drive 930.

In the case where the abovementioned series of processes are performed by software, the program stored at the ROM 904, the storage device 924 or the removable medium 932 of FIG. 20, for example, is read into the RAM 906 at the time of execution and executed by the CPU 902.

It should be understood by those skilled in the art that various modifications, combinations, sub-combinations and alterations may occur depending on design requirements and other factors insofar as they are within the scope of the appended claims or the equivalents thereof.

In the example of the description of this specification, user preferences or content properties are capable of being commonly managed among domains corresponding to two different data spaces. However, it is obvious that the present invention is applicable to three or more data spaces.

The present application contains subject matter related to that disclosed in Japanese Priority Patent Application JP 2009-017190 filed in the Japan Patent Office on Jan. 28, 2009, the entire content of which is hereby incorporated by reference.

What is claimed is:

1. A learning apparatus comprising at least one processor, and further comprising:
   a first data acquisition unit which acquires first user preference data belonging to a first data space;
   a second data acquisition unit which acquires second user preference data of a user in common with the first user preference data, the second user preference data belonging to a second data space which is different from the first data space;
   a compression unit which generates first compressed user preference data having less data item number from the first user preference data by utilizing a first set of parameters; and
   a learning unit which learns a second set of parameters utilized for generating second compressed user preference data having the same data item number as that of the first compressed user preference data from the second user preference data so that difference between the first compressed user preference data and the second compressed user preference data is reduced across a plurality of users.

2. The learning apparatus according to claim 1, wherein the learning unit learns the second set of parameters with the first compressed user preference data generated by the compression unit as training data for the second compressed user preference data.

3. The learning apparatus according to claim 2, wherein the compression unit generates the first compressed user preference data in accordance with a multi-topic model.

4. The learning apparatus according to claim 3, wherein the first set of parameters and the second set of parameters are sets of parameters corresponding to intrinsic distribution of a topic of the multi-topic model.

5. The learning apparatus according to claim 1, wherein the first data space and the second data space are data spaces corresponding to content domains which are different from each other.

6. The learning apparatus according to claim 1, wherein the first data space and the second data space are data spaces of user preference data generated by devices which are different from each other.

7. A learning method, comprising the steps of:
   acquiring first user preference data belonging to a first data space;
   acquiring second user preference data of a user in common with the first user preference data, the second user preference data belonging to a second data space which is different from the first data space;
   generating first compressed user preference data having less data item number from the first user preference data by utilizing a first set of parameters; and
   learning a second set of parameters utilized for generating second compressed user preference data having the same data item number as that of the first compressed user preference data from the second user preference data so that difference between the first compressed user preference data and the second compressed user preference data is reduced across a plurality of users.

8. A program embodied on a non-transitory computer readable medium for causing a computer which controls an information processing apparatus to perform functions comprising:
   a first data acquisition unit which acquires first user preference data belonging to a first data space;
   a second data acquisition unit which acquires second user preference data of a user in common with the first user preference data, the second user preference data belonging to a second data space which is different from the first data space;
   a compression unit which generates first compressed user preference data having less data item number from the first user preference data by utilizing a first set of parameters; and
   a learning unit which learns a second set of parameters utilized for generating second compressed user preference data having the same data item number as that of the first compressed user preference data from the second user preference data so that difference between the first compressed user preference data and the second compressed user preference data is reduced to be small across a plurality of users.

9. An information processing apparatus comprising at least one processor, comprising:
   a data acquisition unit which acquires first user preference data belonging to a first data space; a compression unit which generates first compressed user preference data having less data item number from the first user preference data by utilizing a first set of parameters;
   a storage unit which stores a plurality of data having the same data item number as that of the first compressed user preference data, the plurality of data being generated from second user preference data or content property data belonging to a second data space which is different from the first data space by utilizing a second set of parameters; and
   a selection unit which selects at least single data from the plurality of data stored at the storage unit according to similarity degree to the first compressed user preference data generated by the compression unit, wherein the plurality of data stored at the storage unit are respective data previously generated by utilizing the second set of parameters which is learned so that difference between the first compressed user preference data and second compressed user preference data generated from the second user preference data of a common user is reduced across a plurality of users.

10. A data selection method, comprising the steps of:
    acquiring first user preference data belonging to a first data space;
    generating first compressed user preference data having less data item number from the first user preference data by utilizing a first set of parameters; and
    selecting at least single data from a plurality of data having the same data item number as that of the first compressed user preference data according to similarity degree to the first compressed user preference data, the plurality of data being generated from second user preference data or content property data belonging to a second data space which is different from the first data space by utilizing a second set of parameters, wherein the plurality of data are respective data previously generated by utilizing the second set of parameters which is learned so that difference between the first compressed user preference data and second compressed user preference data generated from the second user preference data of a common user is reduced across a plurality of users.

11. A program embodied on a non-transitory computer readable medium for causing a computer which controls an information processing apparatus to perform functions comprising:
   a data acquisition unit which acquires first user preference data belonging to a first data space;
   a compression unit which generates first compressed user preference data having less data item number from the first user preference data by utilizing a first set of parameters;
   a storage unit which stores a plurality of data having the same data item number as that of the first compressed user preference data, the plurality of data being generated from second user preference data or content property data belonging to a second data space which is different from the first data space by utilizing a second set of parameters; and
   a selection unit which selects at least single data from the plurality of data stored at the storage unit according to similarity degree to the first compressed user preference data generated by the compression unit,
   wherein the plurality of data stored at the storage unit are respective data previously generated by utilizing the second set of parameters which is learned so that difference between the first compressed user preference data and second compressed user preference data generated from the second user preference data of a common user is reduced across a plurality of users.

12. An information processing apparatus comprising at least one processor, comprising:
   a first data acquisition unit which acquires first user preference data belonging to a first data space;
   a second data acquisition unit which acquires second user preference data belonging to a second data space which is different from the first data space;
   a first compression unit which generates first compressed user preference data having less data item number from the first user preference data by utilizing a first set of parameters and stores the first compressed user preference data at a recording medium; and
   a second compression unit which generates second compressed user preference data having the same data item number as that of the first compressed user preference data from the second user preference data by utilizing a second set of parameters and stores the second compressed user preference data at a recording medium,
   wherein the first set of parameters or the second set of parameters is a set of parameters which is learned so that difference between the first compressed user preference data and the second compressed user preference data of a common user is reduced across a plurality of users.

13. A data accumulation method, comprising the steps of:
   acquiring first user preference data belonging to a first data space;
   acquiring second user preference data belonging to a second data space which is different from the first data space;
   generating first compressed user preference data having less data item number from the first user preference data by utilizing a first set of parameters and storing the first compressed user preference data at a recording medium; and
   generating second compressed user preference data having the same data item number as that of the first compressed user preference data from the second user preference data by utilizing a second set of parameters and storing the second compressed user preference data at a recording medium,
   wherein the first set of parameters or the second set of parameters is a set of parameters which is learned so that difference between the first compressed user preference data and the second compressed user preference data of a common user is reduced across a plurality of users.

14. A program embodied on a non-transitory computer readable medium for causing a computer which controls an information processing apparatus to perform functions comprising:
   a first data acquisition unit which acquires first user preference data belonging to a first data space;
   a second data acquisition unit which acquires second user preference data belonging to a second data space which is different from the first data space;
   a first compression unit which generates first compressed user preference data having less data item number from the first user preference data by utilizing a first set of parameters and stores the first compressed user preference data at a recording medium; and
   a second compression unit which generates second compressed user preference data having the same data item number as that of the first compressed user preference data from the second user preference data by utilizing a second set of parameters and stores the second compressed user preference data at a recording medium,
   wherein the first set of parameters or the second set of parameters is a set of parameters which is learned so that difference between the first compressed user preference data and the second compressed user preference data of a common user is reduced across a plurality of users.

15. An information processing apparatus comprising at least one processor, comprising:
   a storage unit which stores a first set of parameters to generate first compressed user preference data having less data item number from first user preference data belonging to a first data space and a second set of parameters to generate second compressed user preference data having the same data item number as that of the first compressed user preference data from second user preference data belonging to a second data space which is different from the first data space; and
   a conversion unit which converts the first user preference data into the second user preference data based on the first set of parameters and the second set of parameters which are stored at the storage unit,
   wherein the first set of parameters or the second set of parameters is a set of parameters which is learned so that difference between the first compressed user preference data and the second compressed user preference data of a common user is reduced across a plurality of users.

16. The information processing apparatus according to claim 15, wherein the conversion unit converts the first user preference data into the second user preference data in accordance with correspondence between data items of the first user preference data and data items of the second user preference data, the correspondence being determined according to similarity degree of parameter values of each data item between the first set of parameters and the second set of parameters.

17. The information processing apparatus according to claim 15, further comprising:
   a compression unit which generates the first compressed user preference data from the first user preference data by utilizing the first set of parameters, wherein the conversion unit determines likely second user preference data capable of generating the first compressed user preference data generated by the compression unit by utilizing the second set of parameters as the second user preference data converted from the first user preference data.

18. A data conversion method, comprising:
a step of converting first user preference data into second user preference data based on a first set of parameters to generate first compressed user preference data having less data item number from the first user preference data belonging to a first data space and a second set of parameters to generate second compressed user preference data having the same data item number as that of the first compressed user preference data from the second user preference data belonging to a second data space which is different from the first data space,
wherein the first set of parameters or the second set of parameters is a set of parameters which is learned so that difference between the first compressed user preference data and the second compressed user preference data of a common user is reduced across a plurality of users.

19. A program embodied on a non-transitory computer readable medium for causing a computer which controls an information processing apparatus to perform functions comprising:
a storage unit which stores a first set of parameters to generate first compressed user preference data having less data item number from first user preference data belonging to a first data space and a second set of parameters to generate second compressed user preference data having the same data item number as that of the first compressed user preference data from second user preference data belonging to a second data space which is different from the first data space; and
a conversion unit which converts the first user preference data into the second user preference data based on the first set of parameters and the second set of parameters which are stored at the storage unit,
wherein the first set of parameters or the second set of parameters is a set of parameters which is learned so that difference between the first compressed user preference data and the second compressed user preference data of a common user is reduced across a plurality of users.

* * * * *